United States Patent
Schatzl et al.

(10) Patent No.: US 10,318,585 B2
(45) Date of Patent: Jun. 11, 2019

(54) FACILITATING EFFICIENT GARBAGE COLLECTION BY DYNAMICALLY COARSENING AN APPEND-ONLY LOCK-FREE TRIE

(71) Applicant: Oracle International Corporation, Redwood Shores, CA (US)

(72) Inventors: Thomas Schatzl, Linz (AU); Nils Mikael Gerdin, Hagersten (SE); Erik Gustav Helin, Stockholm (SE)

(73) Assignee: Oracle International Corporation, Redwood Shores, CA (US)

( * ) Notice: Subject to any disclaimer, the term of this patent is extended or adjusted under 35 U.S.C. 154(b) by 656 days.

(21) Appl. No.: 14/954,358

(22) Filed: Nov. 30, 2015

(65) Prior Publication Data

US 2017/0153973 A1 Jun. 1, 2017

(51) Int. Cl.
*G06F 12/02* (2006.01)
*G06F 16/901* (2019.01)
*G06F 16/17* (2019.01)

(52) U.S. Cl.
CPC ...... *G06F 16/9027* (2019.01); *G06F 12/0269* (2013.01); *G06F 16/1727* (2019.01)

(58) Field of Classification Search
None
See application file for complete search history.

(56) References Cited

U.S. PATENT DOCUMENTS

| | | | |
|---|---|---|---|
| 5,787,430 A * | 7/1998 | Doeringer | ............... H04L 45/54 |
| 6,499,032 B1 * | 12/2002 | Tikkanen | .......... G06F 17/30961 |
| | | | 707/693 |
| 6,728,732 B1 | 4/2004 | Eatherton et al. | |
| 7,539,837 B1 * | 5/2009 | Flood | .................. G06F 12/0276 |
| | | | 707/999.202 |
| 7,808,929 B2 | 10/2010 | Wong et al. | |

(Continued)

OTHER PUBLICATIONS

Joisha; "Sticky Tries: Fast Insertions, Fast Lookups, No Deletions for Large Key Universe", ISMM '14, Jun. 12, 2014, Edinburgh UK.

(Continued)

*Primary Examiner* — James Trujillo
*Assistant Examiner* — John J Morris
(74) *Attorney, Agent, or Firm* — Invoke

(57) ABSTRACT

The disclosed embodiments provide a remembered set implementation for use during an incremental garbage collection, wherein the implementation includes a trie that can be dynamically coarsened to conserve memory. During operation, responsive to storing a reference into a location in a referenced memory area during the execution of a software program, the system finds, within a trie that serves as a remembered set for the referenced memory area, a particular entry that corresponds to a particular address range that covers the location. The system then marks the particular entry to indicate that the particular address range should be processed during a garbage collection. Based on a policy, the system then coarsens a particular subtree of the trie in which the particular entry is stored. Next, during the garbage collection, the system processes a particular larger address range when a root entry of the particular subtree is visited.

18 Claims, 23 Drawing Sheets

(56) References Cited

U.S. PATENT DOCUMENTS 8,495,093 B2 7/2013 Baudel
2011/0208792 A1* 8/2011 Printezis ............. G06F 12/0276
707/819

OTHER PUBLICATIONS

Hosking; "A Comparative Performance Evaluation of Write Barrier Implementations", Proceedings ACM Conference on Object-Oriented Programming Systems, Languages and Applications, Vancouver, Canada, Oct. 1992, pp. 92-109.
Detlefs; "Concurrent Remembered Set Refinement in Generational Garbage Collection", Proceedings of the USENIX Java VM '02 Conference, Aug. 1-2, 2002, San Francisco, CA.
Fitzgerald; "The Case for Profile Directed Selection of Garbage Collectors", Proceedings of the 2nd International Symposium on Memory Management, ACM, New York, NY USA, 111-120, DOI= 10.1145/362422.362472, http://doi.acm.org/10.1145/362422.362472.
Boehm et al.; "Efficient In-Memory Indexing with Generalized Prefix Trees", downloaded from https://pdfs.semanticscholar.org/c5ca/a359fe6b345580a4dd476d5dd41a90bf301c.pdf; Mar. 26, 2018.
Olsson et al.; "Trash a dynamic LC-trie and hash data structure", Trita—CSC—TCS 2006:2, ISRN/KTH/CSC/TCS-2006/2-SE, ISSN 1653-7092, Aug. 18, 2006.
Feng et al.; "Trie-join: a trie-based method for efficient string similarity joins", Published online Oct. 4, 2011; The VLDB Journal Springer-Verlag 2011.

* cited by examiner

FACILITATING EFFICIENT GARBAGE COLLECTION BY DYNAMICALLY COARSENING AN APPEND-ONLY LOCK-FREE TRIE

BACKGROUND

Field

The disclosed embodiments relate to techniques for performing garbage collection operation to facilitate the execution of a software program. More specifically, the disclosed embodiments relate to a technique for implementing a remembered set for use by a generational garbage collector.

Related Art

During the execution of a software program, one or more threads of the software program may dynamically allocate memory on the heap to store objects used by the software program. The execution environment of the software program often provides automatic memory management in the form of a garbage collection system. More specifically, a garbage collector may automatically reclaim memory from dead objects on the heap on behalf of the software program, thereby freeing the software program from having to clean up the heap itself.

However, garbage collectors are not provided without a cost. Certain garbage collector implementations may rely on one or more data structures that are auxiliary to those used by the software program. In some cases, these auxiliary data structures may occupy a significant portion of the heap, thereby reducing the amount of available memory for the software program. Also, accessing these data structures can involve a large number of computation operations. Hence, what is needed is a garbage collector implementation that operates efficiently and with a reduced memory footprint.

SUMMARY

The disclosed embodiments provide a remembered set implementation for use during an incremental garbage collection, wherein the implementation includes an append-only lock-free trie data structure (i.e., a trie) that can be dynamically coarsened to conserve memory.

During operation, responsive to storing a reference into a location in a referenced memory area during the execution of a software program, the system finds, within a trie that serves as a remembered set for the referenced memory area, a particular entry that corresponds to a particular address range that covers the location, wherein (1) the trie includes interior nodes and leaf nodes, (2) each leaf node stores a plurality of entries that each corresponds to an address range in the referenced memory area, and (3) each interior node stores a plurality of entries that each points to a child node of the interior node and corresponds to a larger address range that covers any address range that correspond to an entry stored in the child node. The system then marks the particular entry to indicate that the particular address range should be processed during a garbage collection on the software program. Based on a policy, the system then coarsens a particular subtree of the trie in which the particular entry is stored, wherein a root entry of the particular subtree corresponds to a particular larger address range that covers any address range that corresponds to an entry stored in the subtree. Next, during the garbage collection, the system processes the particular larger address range when the root entry of the particular subtree is visited.

In some embodiments, finding the particular entry includes performing the following actions for one or more descendant nodes of a root entry of the trie: (1) visiting, within the descendant node, an entry that corresponds to an address range that covers the location, (2) if the descendant node is not a leaf node, continuing to search, at a child node pointed to by the visited entry, for the particular entry, and (3) if the descendant node is a leaf node, selecting the visited entry.

In some embodiments, coarsening the particular subtree includes performing the following actions for one or more ancestor nodes of the particular entry: (1) if, based on the policy, the ancestor node should be pruned, marking a parent entry of the ancestor node to indicate that a larger address range that covers the particular address range should be processed during the garbage collection, pruning the ancestor node from the trie and if the parent entry is not a root entry of the trie, continuing to coarsen the particular subtree at a parent node of the ancestor node, and (2) if, based on the policy, the ancestor node should not be pruned, stopping the coarsening of the particular subtree.

In some embodiments, the referenced memory area includes a heap.

In some embodiments, the trie serves as a remembered set for a region of the heap.

In some embodiments, the heap includes a plurality of regions.

In some embodiments, a collection set of the garbage collection includes a first set of regions of the heap and excludes a second set of regions of the heap.

In some embodiments, processing an address range includes scanning the address range for objects that reference one of the regions in the collection set.

In some embodiments, the policy includes setting a coarsening threshold that allows the ancestor node to be pruned if a number of marked entries stored in the ancestor node exceeds the coarsening threshold.

In some embodiments, after setting the coarsening threshold, the policy adjusts the coarsening threshold one or more times.

In some embodiments, the policy includes at least one of:
(i) reducing the coarsening threshold if an amount of free memory available to the software program decreases; and
(ii) reducing the coarsening threshold if an amount of memory occupied by one or more remembered sets increases, wherein the one or more remembered sets includes the remembered set.

In some embodiments, the policy includes at least one of:
(i) increasing the coarsening threshold if a thread count of the software program increases; and
(ii) decreasing the coarsening threshold if a thread count of the software program decreases.

In some embodiments, the policy sets a coarsening threshold based on a property that is unique to the region.

In some embodiments, an entry includes at least one of:
(i) a 32 bit address that refers to a child node of the entry;
(ii) a 64 bit address that refers to the child node of the entry;
(iii) a first special value that indicates that the entry is marked; and
(iv) a second special value that indicates that the entry is unmarked.

As described herein, first, second, third, and other ordinal adjectives are naming conventions that are not necessarily indicative of order unless otherwise functionally required.

BRIEF DESCRIPTION OF THE FIGURES

In the figures, like reference numerals refer to the same figure elements.

DETAILED DESCRIPTION

Figure 1:
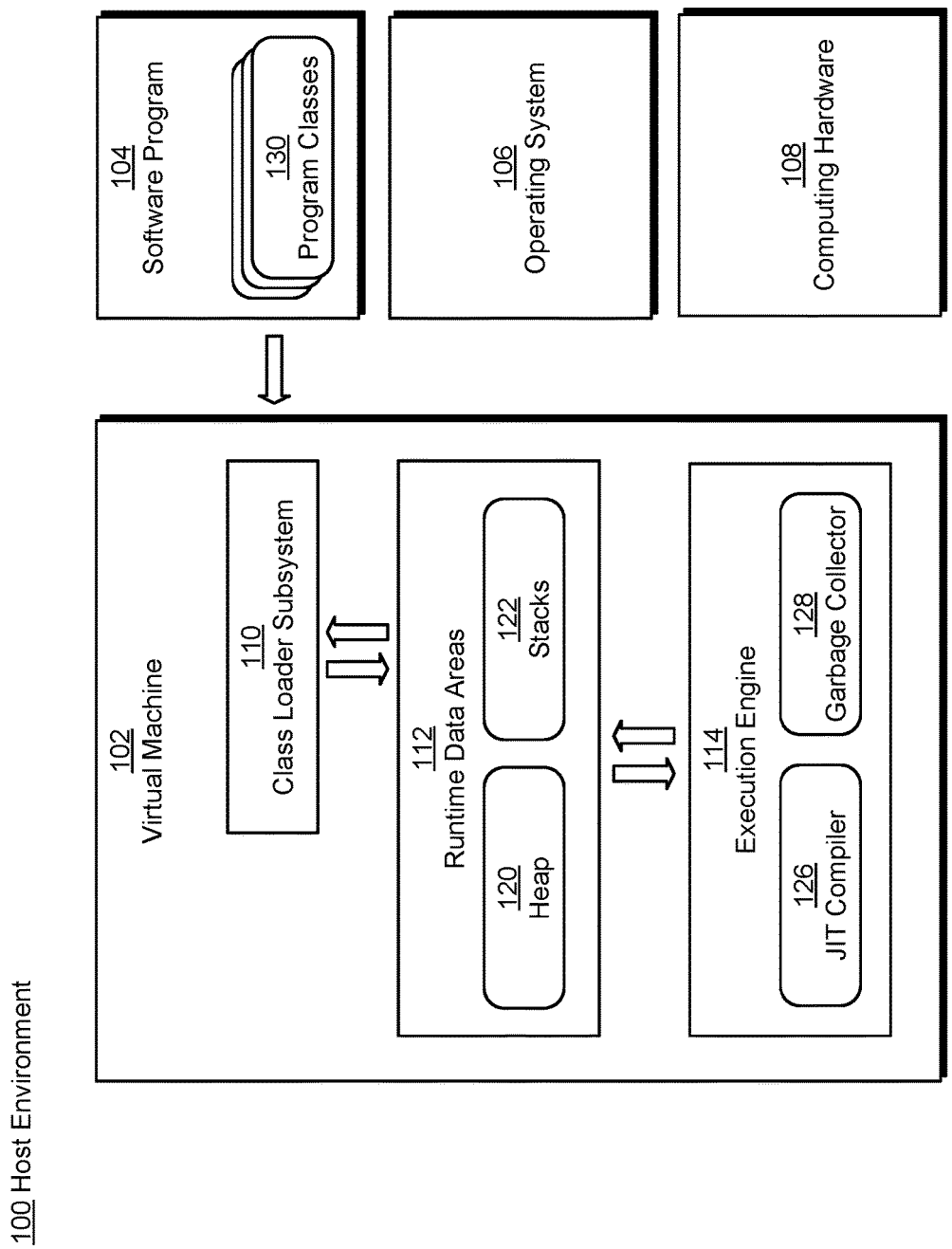
FIG. 1 shows a diagram of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for adjusting garbage collection behavior based on one or more attributes of an execution environment for a software program. During the execution of the software program, the availability of heap memory and processing resources may vary over time. In response, the execution environment may adjust garbage collection behavior to prioritize the conservation of heap memory and/or processing resources.

More specifically, the disclosed embodiments provide a remembered set implementation for use during an incremental garbage collection, wherein the implementation uses an append-only lock-free trie data structure (i.e., a trie) that can be dynamically coarsened to conserve heap memory and/or processing resources based on (1) one or more attributes of the execution environment and/or (2) characteristics specific or unique to a portion of the heap that is associated with the trie.

In general, a software program may rely on a garbage collector provided by the execution environment to reclaim heap memory from dead objects. Because the time to scan the heap for dead objects grows along with the heap's size, the execution environment may provide an incremental garbage collector that periodically performs a garbage collection on only part of the heap (i.e., an incremental garbage collection), wherein the portion of the heap that is garbage collected is referred to as the collection set.

Many garbage collector implementations determine the liveness of objects by finding all reachable objects from the software program's root set (i.e., determining reachability from the root set). However, an incremental garbage collector may not follow references to objects outside the collection set. Thus, to avoid missing objects inside the collection set that are referenced by objects outside the collection set (i.e., which can be referred to as collection set references), the incremental garbage collector may track collection set references using one or more remembered sets. Remembered sets are essentially a set of interesting items/references that should to be tracked using one or more data structures. During each incremental garbage collection, the incremental garbage collector may use the one or more remembered sets to find live objects that may be missed while determining reachability from the root set.

It should be noted, however, that the additional resource requirements of remembered sets may cause and/or exacerbate a shortage in heap memory and/or processing resources in the execution environment. Thus, the disclosed embodiments provide a remembered set implementation that may alleviate such shortages by (1) coarsening a trie used to implement the remembered set to reduce memory usage when heap memory is scarce and (2) uncoarsening the trie to (a) reduce processor usage when processing resources are scarce and/or (b) improve performance within one or more sections of the heap that prioritize it.

During the operation of a software program, a write barrier may detect the reference store when the software program stores a reference to a location on the heap. The garbage collector may then find an entry within the trie that corresponds to a card (i.e., an address range) that covers the location. Note that the trie may be composed of one or more leaf nodes and one or more interior nodes (which include ancestors of the leaf nodes and the root node). Each leaf node of the trie may store a plurality of entries that corresponds to adjacent cards in the heap. Each interior node may store entries that (1) point to a child node of the interior node and (2) correspond to a larger card that covers any card that corresponds to an entry stored in the child node. To find the entry, the garbage collector may, while visiting the root node of the trie, select an entry of the root node that corresponds to a card that covers the location where the reference was stored. The garbage collector then visits the child node that the selected entry points to and repeats the process recursively until the garbage collector selects an entry of a leaf node that corresponds to a card that covers the location. Next, the garbage collector marks the entry to indicate that the card that corresponds to the entry should be processed during the next incremental garbage collection (i.e., dirtying the card).

Next, the trie is dynamically coarsened based on a policy. Starting at the leaf node, the garbage collector may determine, based on the policy, whether the leaf node should be pruned to conserve heap memory. If so, the garbage collector may collapse the leaf node into the leaf node's parent entry by (1) pruning the leaf node (and all of its entries) from the trie and (2) marking the parent entry to indicate that a larger card that corresponds to the parent entry should be processed during the next incremental garbage collection, wherein the larger card covers the card that corresponds to the pruned entry. The garbage collector then visits one or more ancestor nodes of the leaf node and repeats the process recursively until the garbage collector encounters either (1) the root node or (2) an ancestor node that should not be pruned. As a result, the trie has been coarsened to a depth that optimizes a tradeoff between memory usage and card granularity.

Next, during an incremental garbage collection, the garbage collector uses the coarsened trie to determine which sections of the heap to scan. Prior to preserving live objects (e.g., copying the live objects to a survivor space), the garbage collector traverses the coarsened trie to determine which sections of the heap are to be scanned. Each time the garbage collector visits a leaf node (including interior nodes that became leaf nodes due to coarsening), the garbage collector scans the card that corresponds to the node for collection set references. The garbage collector adds any live objects it finds to the set of objects that are to be preserved during the incremental garbage collection.

In general, the memory footprint of auxiliary data structures (e.g., remembered sets) relied upon by the garbage collector grows with the size of the heap. With a large heap, this footprint may be significant. For example, if a remembered set occupies up to 20% of the heap, it would occupy up to 20 gigabytes (GB) of a 100 GB heap, leaving just 80 GB of usable heap memory for the software program. Thus, it may be advantageous to reduce the size of remembered sets. The disclosed embodiments may provide the advantage of efficiently storing remembered sets using a trie that can be dynamically coarsened. Coarsening the trie may reduce the trie's memory footprint pruning one of more nodes from the trie. For example, if a software program performs reference stores to every one of a number of adjacent cards that correspond to entries within a single leaf node, (1) marking the leaf node's parent entry and (2) pruning the leaf node could save memory without jeopardizing the integrity of the software program's state because, even with the leaf node gone, the garbage collector would still scan the larger card that covers the adjacent cards.

It should also be noted, however, that over-coarsening the trie may increase an amount of heap scanning that is disproportionate to the amount of memory saved. This may cause and/or exacerbate a shortage in processing resources, especially for software programs with many threads. In general, determining a static coarseness that is optimal throughout an entire execution of the software program may be difficult. If one or more attributes of the execution environment were to change (e.g., unpredicted drop in free heap memory) so that the static coarseness was no longer optimal, this non-optimal state would persist until the software program finishes execution. One advantage provided by the disclosed embodiments, is that the trie's coarseness may adapt to changes within the execution environment over the course of the software program's execution.

In particular, some embodiments allow the garbage collector to adjust the trie's coarsening behavior to best accommodate one or more resource shortages that change over time.

FIG. 1 shows a diagram of a system in accordance in with the disclosed embodiments. As shown in FIG. 1, software program 104, may execute on virtual machine 102. Virtual machine 102 may execute on top of operating system 106 and/or computing hardware 108, all of which are contained within host environment 100 of the host system. More specifically, during software program 104's execution, program classes 130 of software program 104 may be loaded by class loader subsystem 110 into runtime data areas 112. Additionally, one or more components of execution engine 114 may operate on data present in runtime data areas 112. These components may include Just-in-Time (JIT) compiler 126 and garbage collector 128.

Host environment 100 may correspond to a stack of one or more software components that execute on computing hardware 108, which may correspond to a smartphone, a cell phone, a personal digital assistant (PDA), a laptop computer, a desktop computer, a tablet computer, a server, a cluster of servers, a hypervisor, a container, or an embedded system.

Software program 104 may be an application that executes on an operating system, an embedded application that executes on firmware, an enterprise application, a database, a shared library, a device driver, and/or any other type of software program. Software program 104 may be written in a high-level programming language that can be compiled into an intermediate code via a compiler. Additionally, software program 104, in its intermediate code form, may be configured to execute on virtual machine 102. For example, software program 104 may be written in the Java programming language; virtual machine 102 may follow the Java Virtual Machine (JVM) specification; and software program 104 may be compiled into Java byte code, which may be executed on any software environment that includes a JVM. Additionally, software program 104 may be composed of one or more classes that specifically implement functionality of the software program, which are represented by program classes 130. For example, program classes 130 may each correspond to a class written in a high-level programming language (e.g., Java) that has been compiled to an intermediate code (e.g., Java byte code).

Virtual machine 102 may correspond to any virtual machine that provides one or more data areas for storing software program 104 in its intermediate code form at run time and an interpreter and/or a just-in-time (JIT) compiler the loaded intermediate code. A virtual machine may be referred to as a software implementation of a machine that executes programs like a physical machine. Examples of JVM implementations include Oracle Hotspot JVM and International Business Machines (IBM) JVM. In particular, virtual machine 102 may include class loader subsystem 110, runtime data areas 112, and execution engine 114.

Class loader subsystem 110 may correspond to a component of virtual machine 102 that handles the loading of program classes 130, which have been compiled into intermediate code, into one or more data areas of the virtual machine at run time.

Runtime data areas 112 may correspond to one or more referenced memory areas organized by virtual machine 102 to hold the intermediate code of software program 104 and the data it operates upon during execution. In particular, runtime data areas provided by virtual machine 102 to execute software program 104 may include heap 120 and stacks 122. In cases where software program 104 is multi-threaded, some components of runtime data areas 112 are shared amongst all threads while others are unique to individual threads. One stack exists for each thread. The stack is created when the thread starts. Thus, stacks 122 may refer to all stacks created and assigned to the threads of software program 104. A thread's stack may store the state of one or more current method invocations for the thread in one or more stack frames. A stack frame is created and pushed onto a thread's stack when a method is executed in virtual machine 102 by the thread. When the method finishes, the stack frame is popped off the stack. In particular, a stack frame contains one or more components of the method's state, which may include one or more local variables, one or more parameters with which the method was invoked, one or more return values, and intermediate calculations. Some local variables and/or parameters may hold primitive data values, which are stored in the stack frame. Other local variables and/or parameters may hold references to objects, which are created and stored on heap 120. Thus, object references stored in all stack frames of all stacks for a software program may be referred to as the "root set" of the software program. In some embodiments, the root set may additionally include any object references, such as strings, in a constant pool of loaded classes. The constant pool of a loaded class may refer to strings stored on the heap, such as the class name, superclass name, superinterface names, field names, field signatures, method names, and method signatures.

Heap 120 may correspond to a heap, which is a referenced memory area that stores objects created during the execution of a software program. Unlike stacks, however, a heap may be shared by all threads. Whenever a thread creates an object, the object is stored in a portion of memory allocated on the heap while a reference to the object is created and stored in the current stack frame of the thread. This reference to the object may be passed from method to method within the thread and even shared amongst multiple threads within their stack frames. Threads may then use these references to the object access and modify the object on the heap. Additionally, other objects that are allocated on the heap may possess references to the object. So long as the object is reachable from the software program's root set (e.g., directly by a thread through a reference stored on its stack, or indirectly through one or more other objects on the heap), the object is known as a live object (i.e., an object with liveness). Objects that are unreachable from the software program are considered garbage and are the target of garbage collection. Heaps are discussed in further detail below with respect to FIGS. 2-3.

Execution engine 114 may correspond to a component of virtual machine 102 that executes the intermediate code, which is loaded into runtime data areas 112 by class loader subsystem 110. In particular, the execution engine may employ JIT compiler 126 to periodically compile portions of the intermediate code into native code, which is then directly executed by execution engine 114. Additionally, execution engine 114 may provide garbage collector 128.

Garbage collector 128 may correspond to a garbage collector used by execution engine 114 to manage memory in heap 120 during the execution of software program 104. Functions performed by garbage collectors may include (1) automatically clearing garbage (i.e., unreachable objects) from the heap and (2) moving objects between sections of the heap to reduce heap fragmentation. A software program may constantly create and store objects in heap memory. Garbage collectors may prevent the heap from running out of memory by automatically reclaiming objects that are unreachable from the software program's root set. Additionally, free space within the heap may become fragmented due to objects being allocated and reclaimed at various locations throughout the heap. To help ensure that the heap can provide large contiguous blocks of memory, with which to store larger objects of the software program, the garbage collector may periodically compact all live objects into alternate sections of the heap, thereby combining small pockets of free heap space into larger ones. To accomplish these tasks more efficiently, the garbage collector may conceptually divide the heap into (1) multiple generations and into (2) multiple regions, as discussed in further detail below with respect to FIGS. 2-3.

Figure 2:
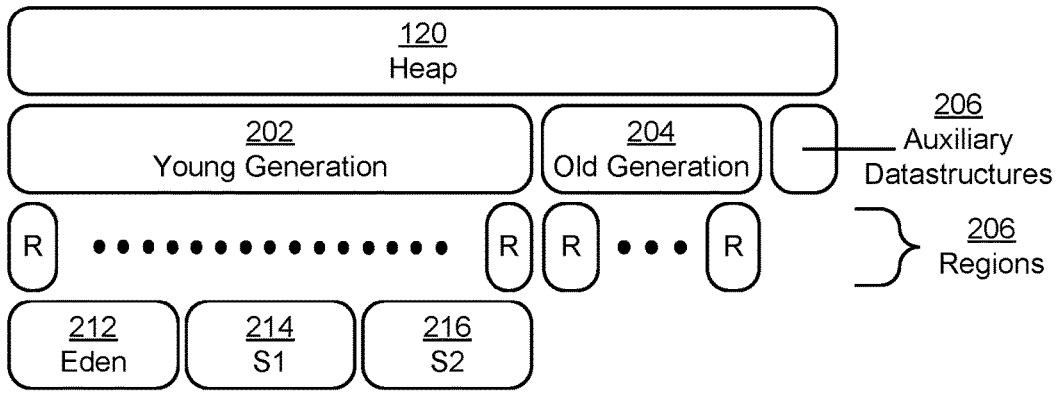
FIG. 2 shows a conceptual division of a heap into multiple parts in accordance with the disclosed embodiments.
Figure 3:
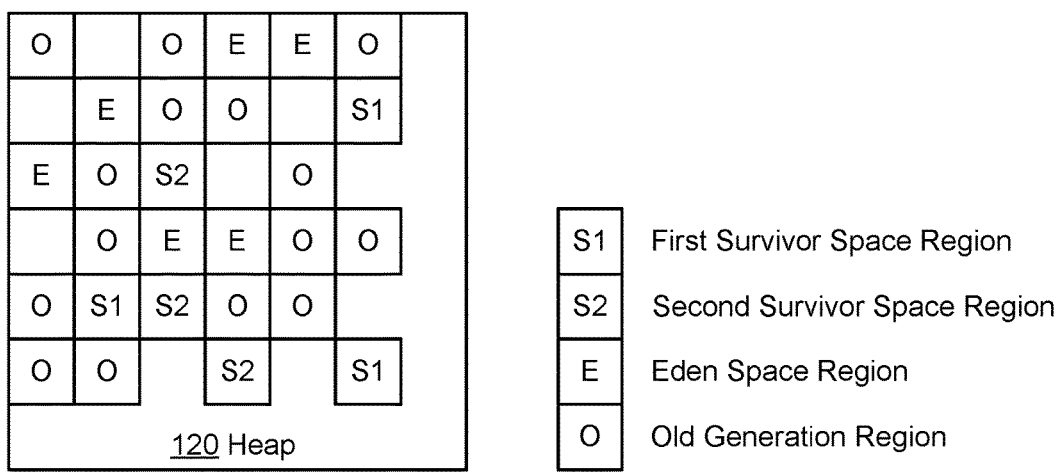
FIG. 3 shows a conceptual division of a heap into multiple parts in accordance with the disclosed embodiments.

FIGS. 2-3 both show conceptual divisions of a heap into multiple parts in accordance with the disclosed embodiments. More specifically, FIG. 2 displays how a garbage collector may conceptually divide a heap into multiple generations so that incremental garbage collections can occur. FIG. 3 displays how the garbage collector may also divide a heap into multiple regions, wherein each region is assigned to one of the generations.

Garbage collector 128 may execute via one or more threads that operate on data stored in runtime data areas 112. To perform certain tasks, garbage collector 128 may invoke one or more "stop-the-world" events during the duration of software program 104's execution. During a stop-the-world event, all threads of software program 104 are paused, allowing threads of garbage collector 128 to complete tasks that cannot be interrupted without risking the integrity of the software program's runtime state. If the heap is large, stop-the-world events can halt a software program for seconds, which can affect the usability of the software program. In some embodiments, garbage collector 128 may be an incremental garbage collector that performs periodic garbage collections on a collection set. In particular, garbage collector 128 may be a general garbage collector that divides heap 120 into multiple generations, which include young generation 202 and old generation 204. Young generation 202 may correspond to a part of heap 120 that stores young objects while old generation 204 may correspond to another part of the heap that stores old (tenured) objects. In particular, the "age" of an object refers to the number of garbage collections the object has survived.

Because objects that have survived a threshold number of garbage collections (i.e., older objects) are less likely to yield free space during future garbage collections, garbage collector 128 may (1) keep old objects in old generation 204 and young objects in young generation 202 and (2) perform garbage collections more frequently on young generation 202 (i.e., perform an incremental garbage collection with young generation 202 as the collection set) and performing garbage collections less frequently on old generation 204. In some embodiments, a general garbage collector may divide heap 120 into any number of generations.

Young generation 202 may be further divided into the following parts: Eden space 212, first survivor space 214, and second survivor space 216. Newly created objects may initially be stored in Eden space 212. During an incremental garbage collection, garbage collector 128 may move living objects from Eden space 212 and first survivor space 214 into second survivor space 216 and clear spaces 212-214 of garbage. During a subsequent incremental garbage collection, garbage collector 128 may move living objects from Eden space 212 and second survivor space 216 back into first survivor space 214, before clearing spaces 212 and 216 of garbage.

To more efficiently conduct garbage collection over heap 120, garbage collector 128 may divide heap 120 into a plurality of equally sized regions (regions 206) and assign each region to either young generation 202 or old generation 204. As shown in FIG. 3, part of heap 120 may be allocated to form a plurality of regions while the rest of the heap may exist as free space from which new regions may be allocated on demand. In particular, Eden space 212 may be composed of the regions that contain an 'E', first survivor space 214 may be composed of the regions that contain "S1", second survivor space 216 may be composed of the regions that contain "S2", and old generation 204 may be composed of the regions that contain an 'O'. To assist garbage collector 128 in efficiently scanning regions for collection set references (e.g., objects stored within old generation regions that reference an object stored within a young generation region), regions may be further divided into address ranges called "cards." For example, a 50 GB heap may be subdivided into a number of 32 MB (megabyte) regions, wherein each region is subdivided into 512 byte cards. Regions may then each be assigned to a remembered set, which tracks reference stores within the region. It should be noted that in some embodiments, each region may be assigned its own remembered set. In other embodiments, a single remembered set may handle multiple regions. In still other embodiments, different portions of a region may be handled by different remembered sets.

To preserve the runtime state of software program 104 during each incremental garbage collection, garbage collector 128 may move and/or copy out all living objects within a region prior to garbage collecting that region. Living objects that need to be preserved during an incremental garbage collection can be divided into two main groups. The first group of live objects are those that garbage collector 128 can reach by following one or more references from software program 104's root set. To reduce the time it takes to perform an incremental garbage collection, however, garbage collector 128 may not follow references to objects outside of the collection set (e.g., references to old objects) when determining reachability from the root set. As a result, the first group may leave out live objects whose path from the root set passes through at least one reference to an old object. The second group of live objects includes those that are found via one or more remembered sets. For example, a remembered set that is assigned to an old generation region may track all collection set references in the region (e.g., references from objects in the old generation region to objects in any young generation region). A card table is a more efficient type of remembered set that tracks collection set references at a coarser granularity. A card table that is assigned to an region may (1) rely on a write barrier to detect any reference stores within the region and (2) in response to a reference store, mark a card of the region that covers the location where the reference was stored. In doing so, the card table records all cards within a region that potentially has an collection set reference. It should be noted that the card table may be implemented with a dynamically coarsening trie, as discussed in further detail below with respect to FIGS. 4A-4G.

Next, during the incremental garbage collection, garbage collector 128 may (1) determine reachability from the root set and (2) scan for collection set references in all marked cards of all remembered sets in the heap to find live objects that were missed in the reachability determination. After moving and/or copying out these objects, garbage collector 128 then garbage collects all other objects within the collection set.

It should also be noted that garbage collector 128 may allocate memory from heap 120 to store auxiliary data structures 206, which may include one or more remembered sets. Although FIG. 2 depicts auxiliary data structures 206 as being stored in a separate part of the heap, other ways of organizing auxiliary data structures in heap 120 may be used (e.g., storing remembered sets within each region of the heap).

FIGS. 4A-4G show a coarsening of a trie in accordance with the disclosed embodiments. More specifically, FIGS. 4A-4G illustrate one or more interactions between an region and a card table assigned to track reference stores within the region, wherein the card table includes a dynamically coarsening trie.

Figure 4A:
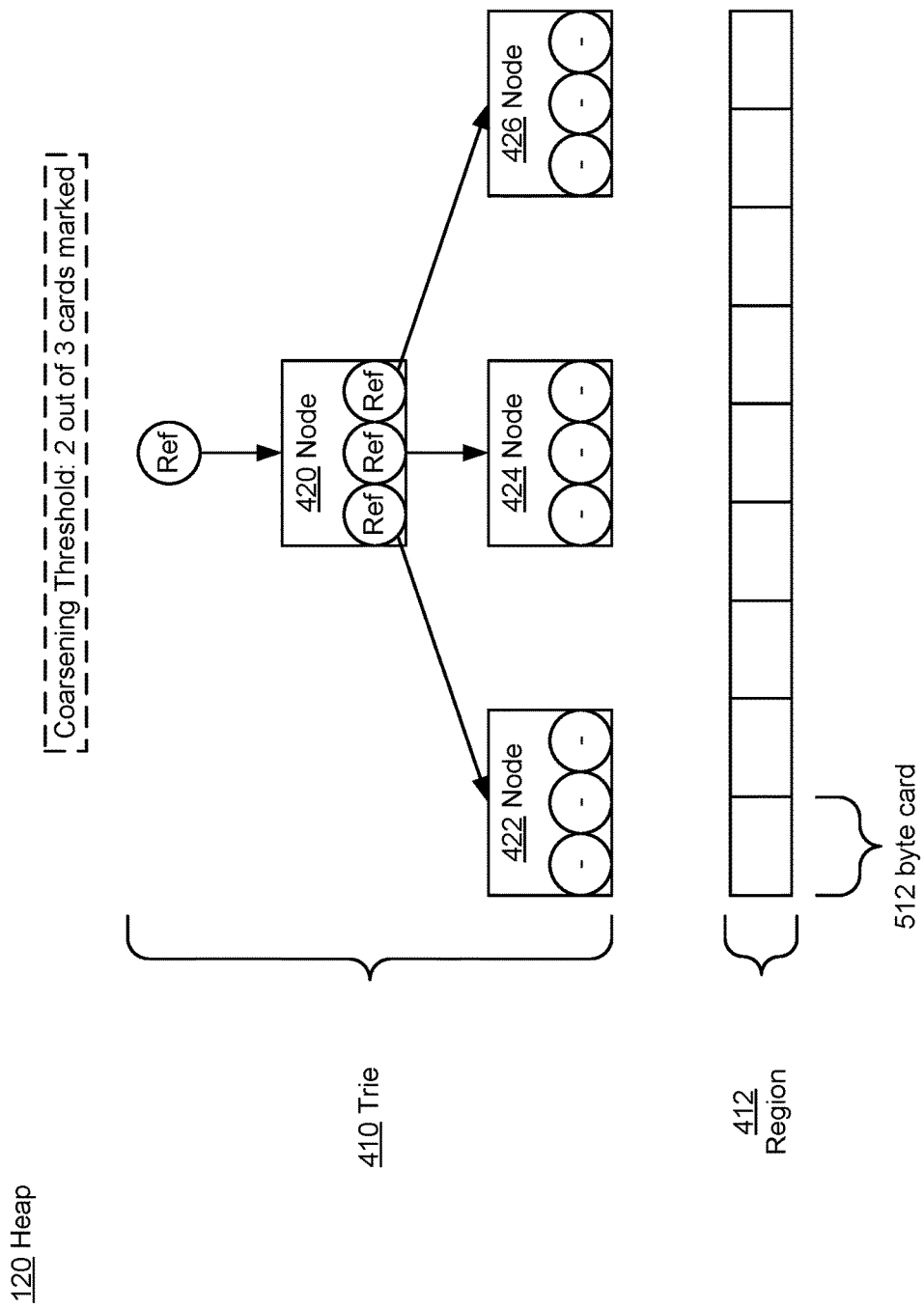
FIGS. 4A-4G show a coarsening of a trie in accordance with the disclosed embodiments.

FIG. 4A displays an region (region 412) and a trie (trie 410) that implements a card table for tracking reference stores within the region. Region 412 is divided into nine equally sized cards and each card covers an address range that is 512 bytes long. Here, the size of region 412 would be around 4.5 MB. Trie 410 has three levels and each node of the trie has a maximum degree of three. It should be noted, however, that the specific configuration shown in any of the figures (e.g., the type of region, the type of remembered set, size of the cards, number of cards in a region, number of nodes in the trie, depth of the trie, degree of each node) should not be construed as limiting the scope of the embodiments. In particular, the number of cards within a region and the region's total size in megabytes would likely both be a multiple of two in practice (e.g., the size of a region with 16 cards of 512 bytes each would be around 8 MB). In alternative embodiments, trie 410 may implement a type of remembered set that is different from a card table (e.g., a remembered set that stores individual collection set references rather than cards). In other alternative embodiments, trie 410 may track reference stores for only a portion of a region or for a plurality of regions within the heap.

The first level of trie 410 (i.e., the top level) includes the top entry (i.e., the root entry) that contains a reference to node 420. The second level (i.e., the middle level) includes interior node 420, which contains three sibling entries that each contain a reference to a child node. The third level (i.e., the bottom level) includes leaf nodes 422-426, which each contain three sibling entries: a left entry, a middle entry, and a right entry. Each of the nine leaf entries on the third level corresponds to one of the nine cards of region 412. Additionally, entries that contain a reference to a child node correspond (conceptually or otherwise) to a larger card that covers any card that corresponds to an entry stored in the child node. In particular, the entry that points to node 422 corresponds to a larger card that covers the three leftmost cards of region 412, the entry that points to node 424 corresponds to a larger card that covers the middle three cards of the region, and the entry that points to node 426 corresponds to a larger card that covers the three rightmost cards of the region. Additionally, the root reference corresponds to a still larger card that covers all nine cards in region 412.

In general, an entry may contain a reference to a child node (e.g., a 32 bit address or a 64 bit address), a special value that corresponds to a marked card (e.g., setting one or more spare unused bits in the address), or another special value that corresponds to an unmarked card (e.g., unsetting one or more spare unused bits in the address). In some embodiments, an entry may contain a pair of integers (e.g., a start offset and a range) that indicates an address range (i.e., card) that the entry corresponds to. In another embodiment, an entry may contain a small bitmap that indicates which parts (cards) of the address range covered by region 412 corresponds to the entry. Additionally, for one or more nodes in trie 410, one or more of these values may be encoded directly into the node's reference to a child node using (1) spare unused bits of the reference and/or (2) separately from the reference. It should be noted that the phrase "mark a card" refers to marking an entry that corresponds to the card to indicate that the card should be processed in the next incremental garbage collection. It should also be noted that the phrase "marked card" refers to a card that is to be scanned during the next incremental garbage collection.

FIG. 4A additionally shows that the policy for the trie has set a coarsening threshold of two out of three cards marked, which means that any node that contains two or more marked entries is to be pruned. As shown in FIG. 4A, because no reference stores have been performed to region 412, none of the cards are marked and none of the nodes in trie 410 are pruned. However, a write barrier may be placed over region 412 to detect reference stores.

Figure 4B:
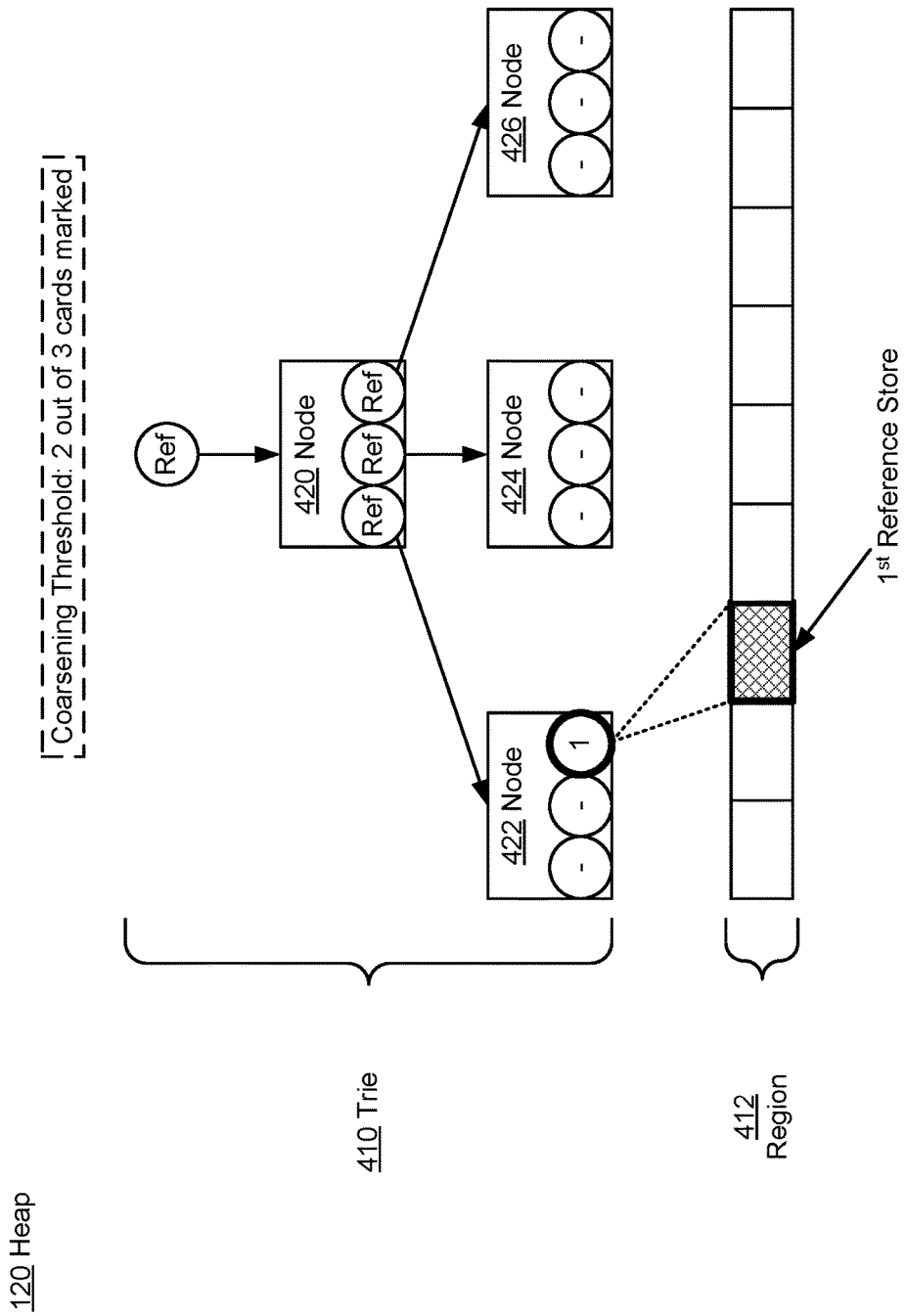

FIG. 4B displays one or more operations that occur in trie 410 and region 412 in response to a first reference store by software program 104. As shown in FIG. 4B, the program stores a reference to the third card (i.e., third card from the left) of region 412. Once the write barrier detects the reference store, garbage collector 128 uses the location of the reference store to find the deepest (i.e., furthest from the root entry) entry within trie 410 that corresponds to the card that covers the location. Starting from the root entry of trie 410, garbage collector 128 inspects the root entry's value. After determining that the root entry contains a reference to a child node, the garbage collector visits node 420. At node 420, garbage collector 128 determines which of node 420's three entries corresponds to a card that covers the location. Here, the left entry corresponds to a larger card that covers the three leftmost cards of the region, which includes the third card. Thus, the garbage collector visits node 422. At node 422, garbage collector 128 determines which of node 422's three entries corresponds to a card that covers the location. After determining that (1) the right entry corresponds to the third card and (2) the right entry is a leaf entry, the garbage collector selects the right entry as the card that should be marked.

Garbage collector 128 then marks the third card by modifying the right entry (as indicated by the '1' in the right entry) to indicate that (1) at least one reference (which could held by a field of an object stored in region 412) has been modified within the address range covered by the third card, (2) the reference could now point to an object inside the collection set, and (3) the address range should be scanned during the next incremental garbage collection.

Because the state of trie 410 has changed, garbage collector 128 attempts to coarsen the trie. Starting from the leaf node that contains the just-marked entry, garbage collector 128 determines, based on the coarsening threshold, whether node 422 should be pruned. Here, the coarsening threshold indicates that a node can be pruned only if it stores two marked entries. Because node 422 only stores one marked entry, node 422 should not be pruned. As a result, garbage collector 128 stops coarsening trie 410 until the next reference store.

Figure 4C:
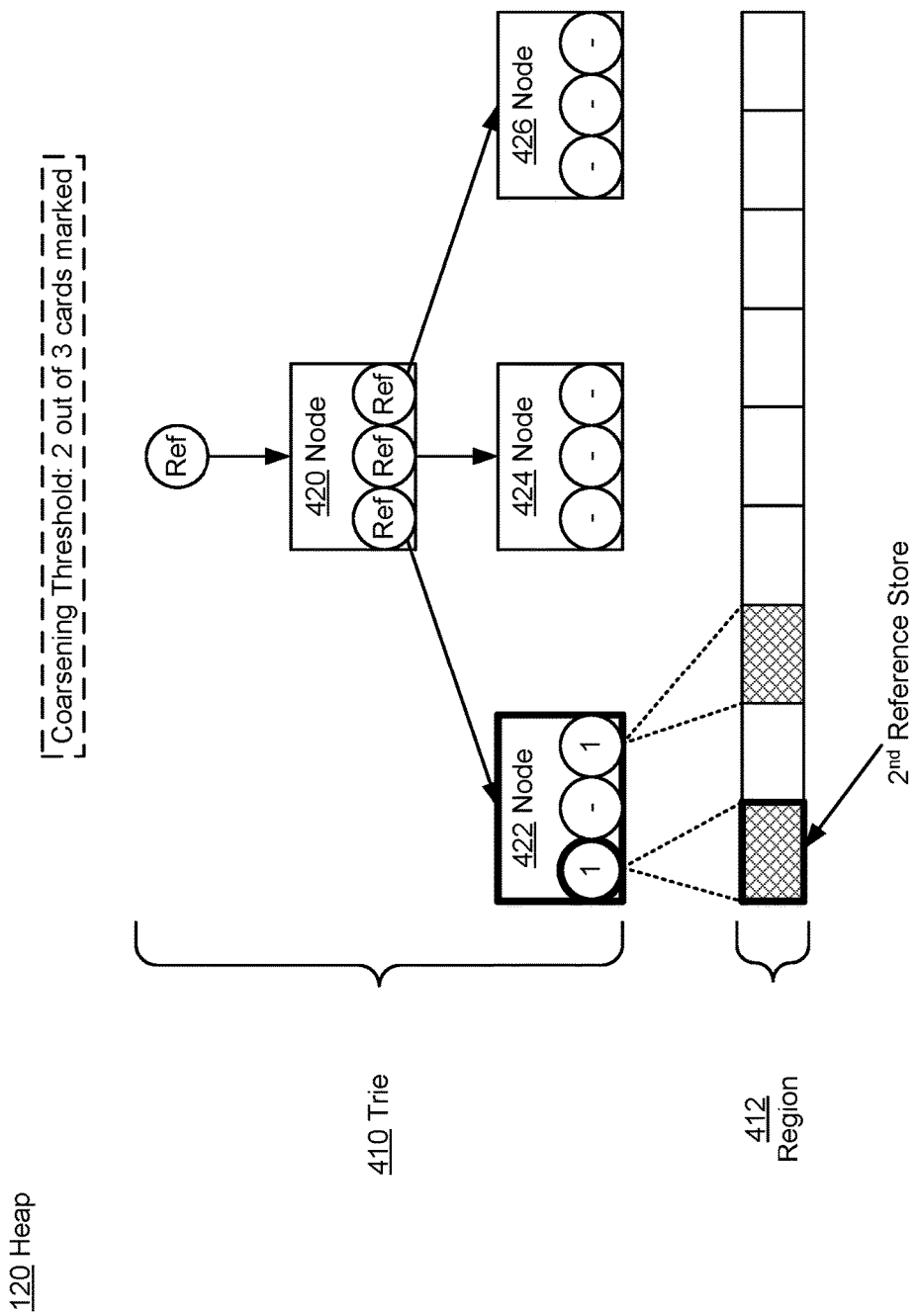
Figure 4D:
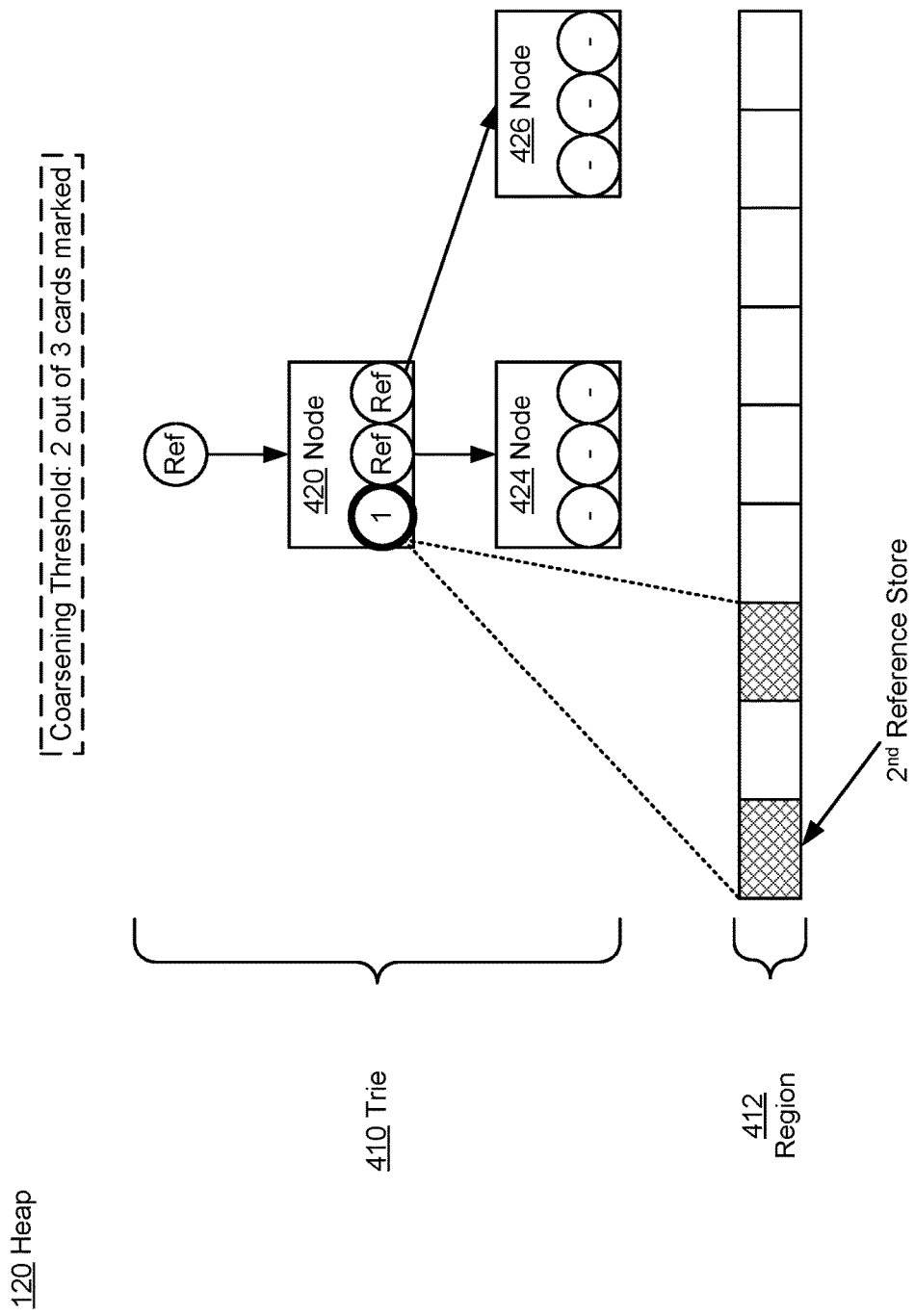

FIGS. 4C-4D displays one or more operations that occur in trie 410 and region 412 in response to a second reference store by software program 104. As shown in FIG. 4C, the program stores a reference to the first card of region 412. In response to the second reference store, garbage collector 128 finds the deepest entry within trie 410 that corresponds to the card that covers the location of the store, which is determined to be the left entry of node 422. Garbage collector 128 then marks the first card by modifying the left entry of node 422 (as indicated by the '1' in the entry).

Because the state of trie 410 has changed, garbage collector 128 again attempts to coarsen the trie. Starting from node 422, the garbage collector determines that because node 422 now stores two marked entries, node 422 should be pruned. As shown in FIG. 4D, garbage collector 128 prunes the node from trie 410 and replaces the reference value in the left entry of node 420 with the special value that corresponds to a marked card. This modification to the entry indicates that at least one reference has been modified within the address range covered by the three leftmost cards (i.e., the larger card that corresponds to the left entry of node 420). It should be noted that due to this coarsening, when garbage collector 128 visits the left entry of node 420 during the next incremental garbage collection, the garbage collector will scan an address range covered by the three leftmost cards for collection set references even though no references have been stored to the second card. Thus, the tradeoff is made by pruning node 422, wherein trie 410 occupies less memory (e.g., memory for storing three nodes instead of four nodes) while garbage collector 128 performs more scanning (e.g., scanning three cards instead of two cards).

Because node 420 has been modified, garbage collector 128 determines whether node 420 should be pruned. However, because node 420 only stores one marked entry, node 420 does not meet the coarsening threshold of two marked entries. As a result, garbage collector 128 stops coarsening trie 410 until the next reference store.

Figure 4E:
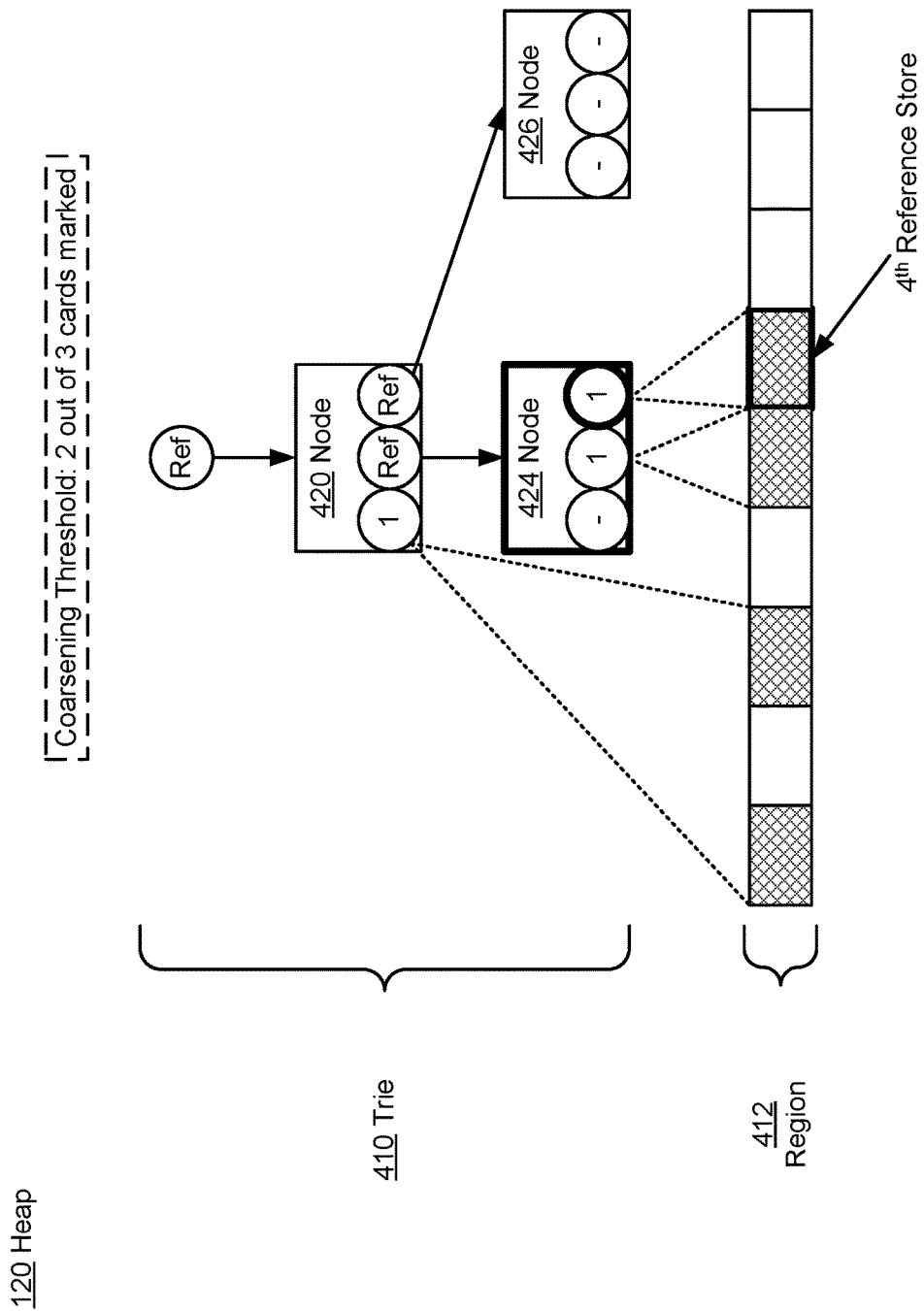
Figure 4F:
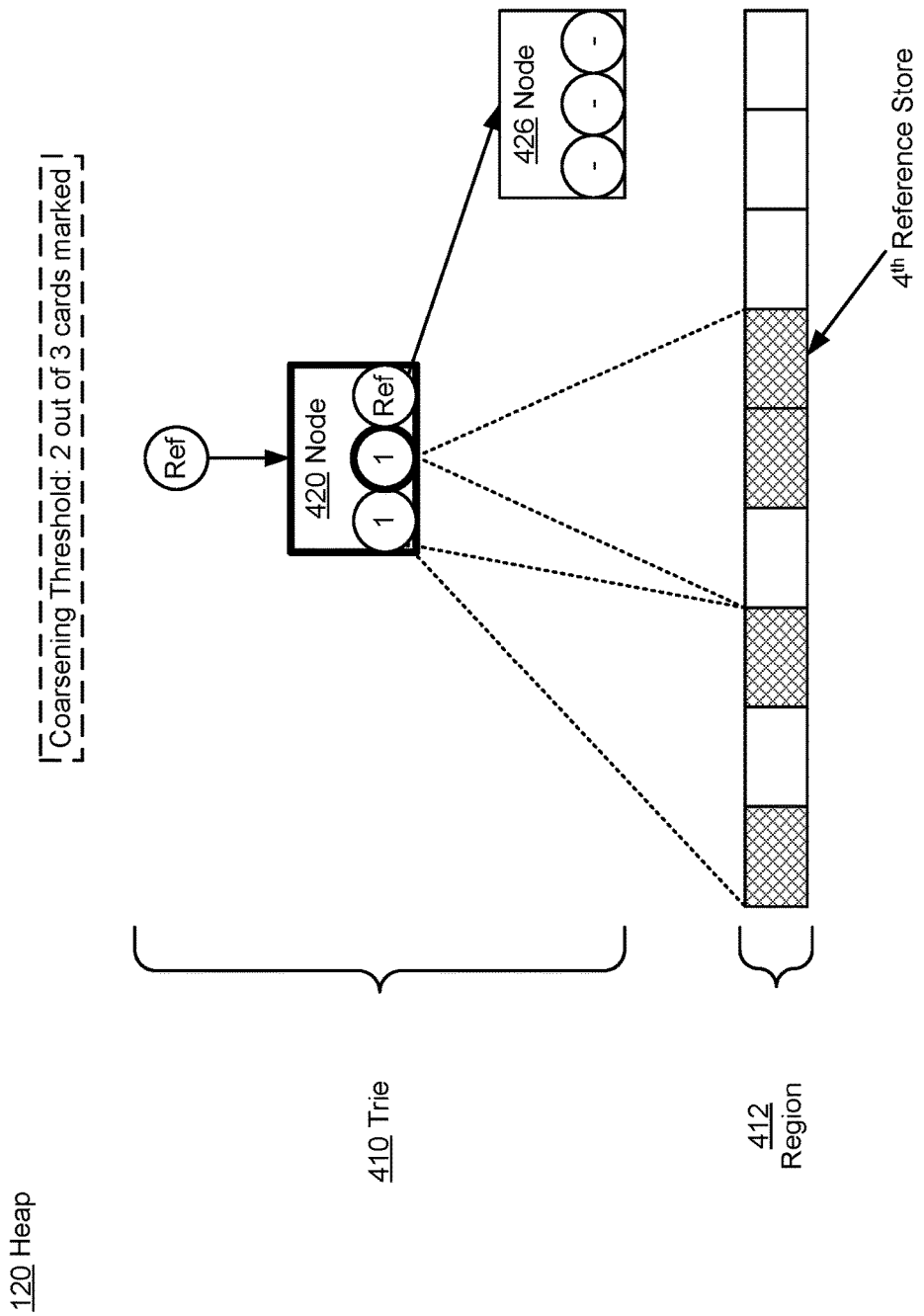
Figure 4G:
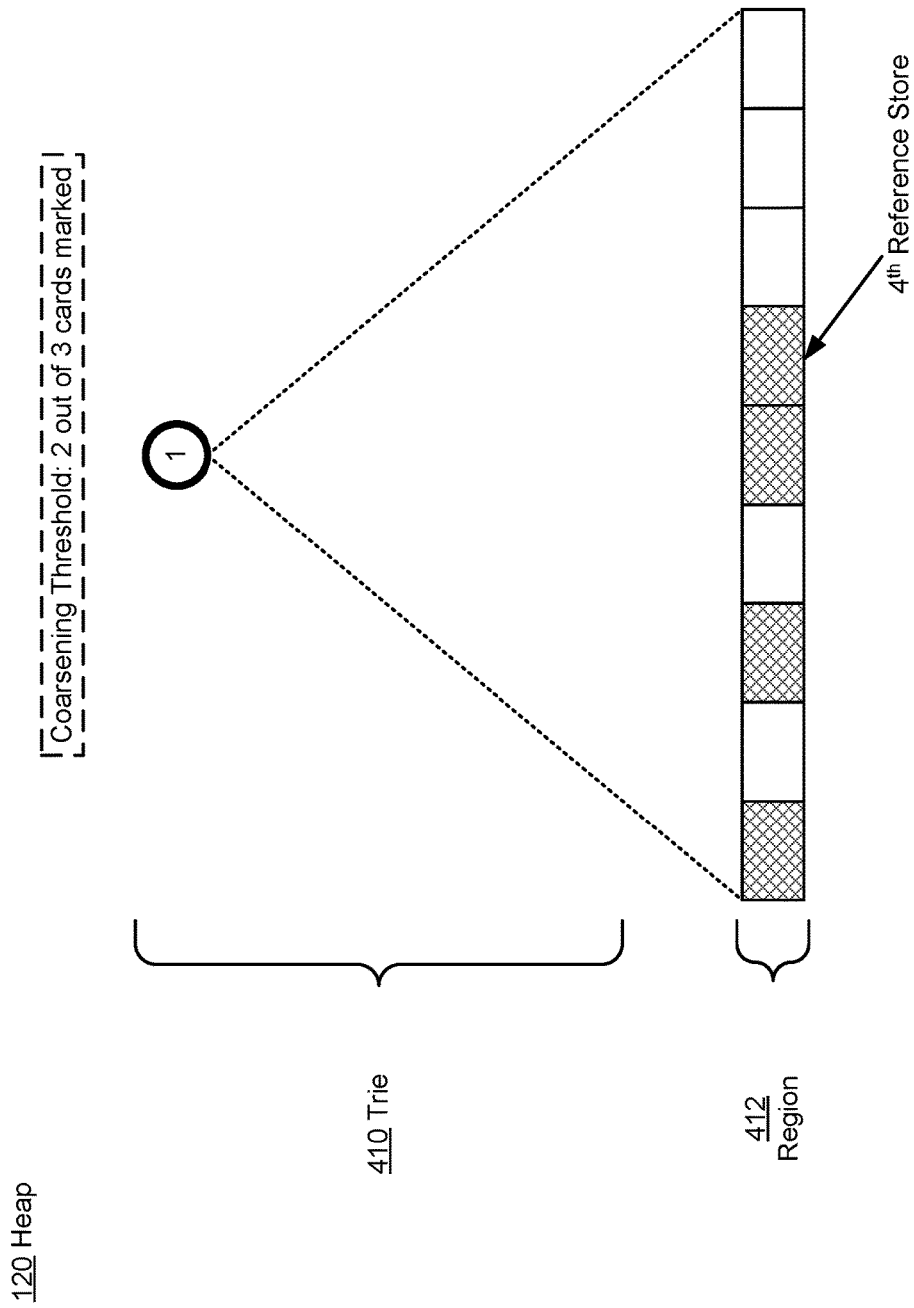

FIGS. 4E-4G displays one or more operations that occur in trie 410 and region 412 in response to a fourth reference store by software program 104. As shown in FIG. 4E, after storing a third reference (not shown), the program stores a reference to the sixth card of region 412. Again, in response to the fourth reference store, garbage collector 128 finds the deepest entry within trie 410 that corresponds to the card that covers the location of the store, which is determined to be the right entry of node 424. Garbage collector 128 then marks the sixth card (as indicated by the '1' in the entry).

Because the state of trie 410 has changed, garbage collector 128 again attempts to coarsen the trie. Because node 424 stores two marked entries, node 424 should be pruned. As shown in FIG. 4F, garbage collector 128 (1) prunes the node from trie 410 and (2) replaces the reference value in the middle entry of node 420 with the special value that corresponds to a marked card.

Because node 420 has been modified, garbage collector 128 determines whether node 420 should be pruned. Because node 420 now stores two marked entries, node 420 should be pruned. As shown in FIG. 4G, garbage collector 128 (1) prunes the node from trie 410 and (2) replaces the reference value in the root entry with the special value that corresponds to a marked card. This modification to the root entry indicates that at least one reference has been modified within the address range that covers all nine cards (i.e., the entirety of region 412). It should be noted that due to this coarsening, when garbage collector 128 visits the root entry of trie 410 during the next incremental garbage collection, the garbage collector will scan the entire region for collection set references, even though no references have been stored to the second, fourth, seventh, eighth, and ninth cards. Again, a tradeoff is made, wherein trie 410 occupies less memory (e.g., memory for storing a single reference instead of four nodes) while garbage collector 128 performs more scanning (e.g., scanning nine cards instead of four cards).

In some many situations, making these tradeoffs may be advantageous depending on the execution environment of software program 104. For example, if free heap memory is scarce but processing resources are plentiful in software program 104's execution environment, it may be advantageous to coarsen one or more tries (which may include trie 410) to reduce their memory footprint because there may be enough processing resources to accommodate the scanning of more cards without affecting the usability of software program 104.

One advantage of using a policy to control the coarsening behavior of a trie is the ability to base the coarsening threshold one or more attributes of the execution environment. In some embodiments, a coarsening threshold may be calculated based on a memory constraint. For example, a policy may decrease the coarsening threshold if the amount of heap memory occupied by auxiliary data structures of the garbage collector exceeds a certain maximum memory threshold (i.e., the policy tries not to let auxiliary data structures occupy too much of the heap). In another example, a policy may decrease the coarsening threshold if the amount of free heap memory falls below a minimum memory threshold (i.e., the policy attempts to reduce memory usage of auxiliary data structures if free memory is scarce). In some embodiments, the coarsening threshold may be calculated based on available processing resources. For example, a policy may increase (or not decrease) a coarsening threshold if the number of threads spawned by the software program exceeds a maximum thread threshold (i.e., the policy tries to reduce processor usage by garbage collector threads to provide more processing resources to software program threads). In another example, if available processing resources falls below a minimum processing threshold but free heap memory increases and/or stays above a minimum memory threshold, a policy may increase (or not decrease) a coarsening threshold (i.e., the policy tries to reduce processor usage by garbage collector threads if processing resources are scarce while free memory is plentiful). In another example, a policy may decrease the coarsening threshold even if free heap memory stays above a minimum memory threshold if processing resources also increases and/or stays above a minimum threshold (i.e., the policy prioritizes reducing memory footprint even if memory plentiful so long as processing resources are plentiful). In some embodiments, one or more policies and/or coarsening thresholds may be specified by a user for the software program via one or more configuration files and/or one or more command line options to the software program's executable. It should be noted that in some embodiments, in addition to setting coarsening thresholds, a policy may control the coarsening behavior of tries by setting minimum trie depths (i.e., never coarsening a trie closer than a number of branches away from the root entry), maximum trie depths (i.e., always coarsening a trie to a maximum depth), and/or other values that might affect the structure (e.g., depth) of a trie.

Another advantage of using a policy to control the coarsening behavior of a trie is the ability to apply different policies to different regions of the heap, wherein a policy that is applied to a region is tailored to one or more specific and/or unique characteristics and/or properties of the region. For example, a policy applied to one region of the heap may be based on a memory constraint while another policy applied to another region of the same heap may be based on a processing resources constraint. In another example, two regions of a heap may both have policies that are based on the same memory constraint. However, the policy for the first of the two regions may specify a higher/stricter coarsening threshold (i.e., a threshold with a higher ratio of marked cards to unmarked cards) than the policy for the other region. In another example, a region of the heap may be garbage collected less often than other regions of the heap or not at all (e.g., because the user specifies that memory in the region cannot be moved). As a result, the policy for the region may set a less strict coarsening threshold or a lower maximum trie depth. In yet another example, a region of the heap may be garbage collected more often than other regions of the heap. As a result, the policy for the region may set a stricter coarsening threshold or a higher minimum trie depth.

In general, policies and the coarsening thresholds they set may be mapped in various ways to the heap. A single policy may set a single threshold that applies across the entire heap, across one or more regions, across one or more subtrees within a trie, across one or more levels within a trie, or across one or more nodes within a trie. A single policy may also set multiple different thresholds to different parts of the heap as well. In embodiments where multiple policies may be applied to different parts of the heap, a single policy may apply across the entire heap, across one or more regions, across one or more subtrees within a trie, across one or more levels within a trie, or across one or more nodes within a trie.

Another advantage of using a policy to control the coarsening behavior of a trie is the policy's ability to dynamically adjust the coarsening behavior of the trie in response to changes that occur over time to one or more attributes of the execution environment. For example, a policy for a software program may set a particular coarsening threshold at the start of the software program when free heap memory is plentiful. As the software program continues to execute and allocate objects on the heap, free heap memory may become scarce. The policy may respond by setting a less strict coarsening threshold in an attempt to reduce the memory footprint of tries. In general, a policy may change a coarsening threshold, a minimum trie depth, and/or a maximum trie depth depending on one of or a combination of the following: an amount of free heap memory, an amount of memory occupied by auxiliary data structures, a number of active threads of the software program, processor utilization levels, a change in one or more characteristics/properties of the region associated with the policy (e.g., undergoing more or less garbage collections), and other attributes of the software program's execution environment. The ability of policies to adjust the coarsening behavior of tries is discussed in further detail below with respect to FIGS. 5A-5F FIGS. 5A-5F show a coarsening of a trie based on a policy in accordance with the disclosed embodiments. More specifically, FIGS. 5A-5F illustrate one or more interactions between an region and a card table in response to one or more references stored to the region in an execution environment that changes over time.

Figure 5A:
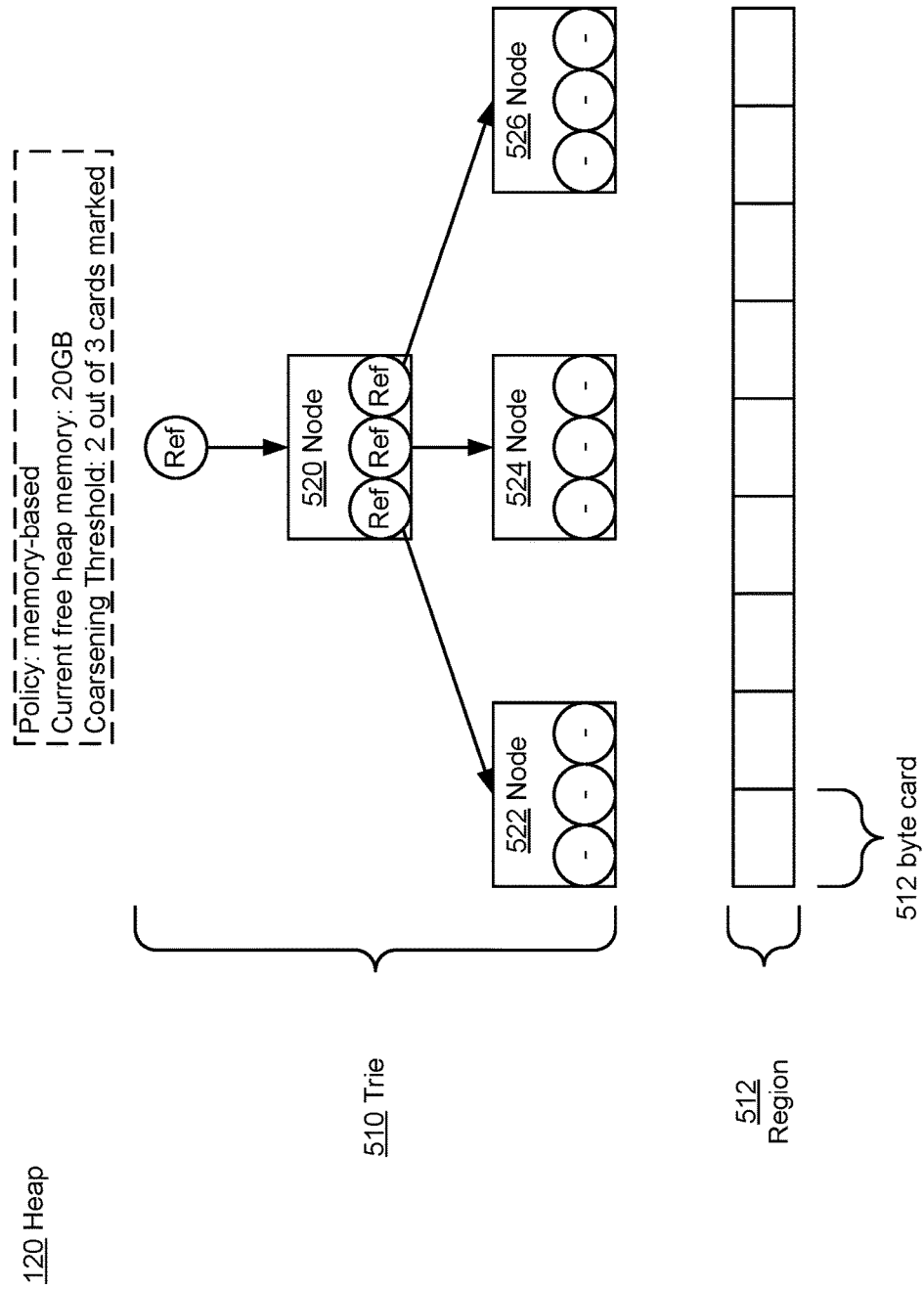
FIGS. 5A-5F show a coarsening of a trie based on a policy in accordance with the disclosed embodiments.

FIG. 5A displays an region (region 512) and a trie (trie 510) that implements a card table for tracking reference stores within the region. Region 512 is divided into nine equally sized cards and each card covers an address range that is 512 bytes long. Trie 510 has three levels and each node of the trie has a maximum degree of three.

The top level of trie 510 includes the root entry, which contains a reference to interior node 520. The middle level includes node 520, which contains a left, a middle entry, and a right entry that each contains a reference to a child node. The bottom level includes leaf nodes 522-526, which each contain a left entry, a middle entry, and a right entry.

Figure 5B:
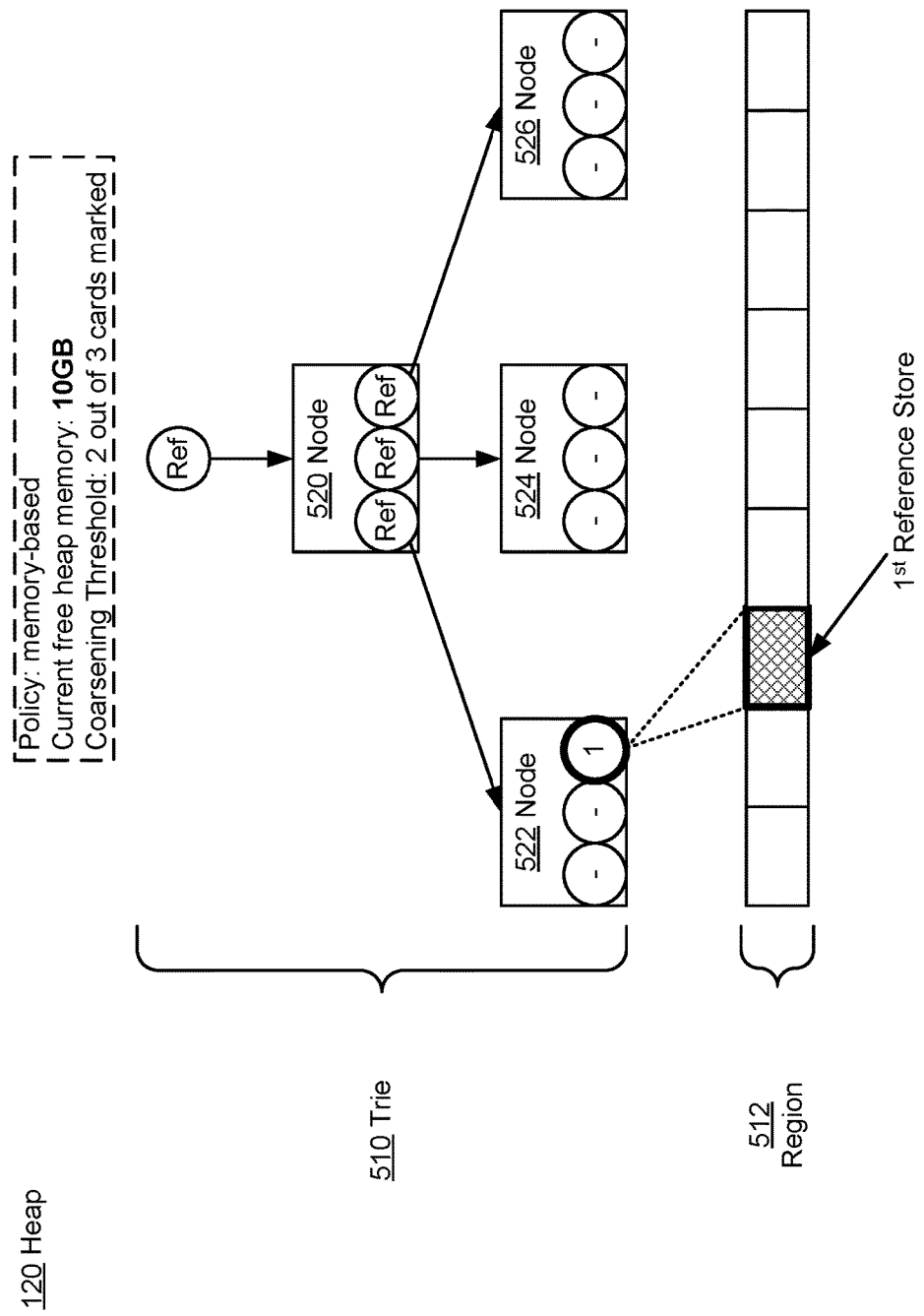
Figure 5C:
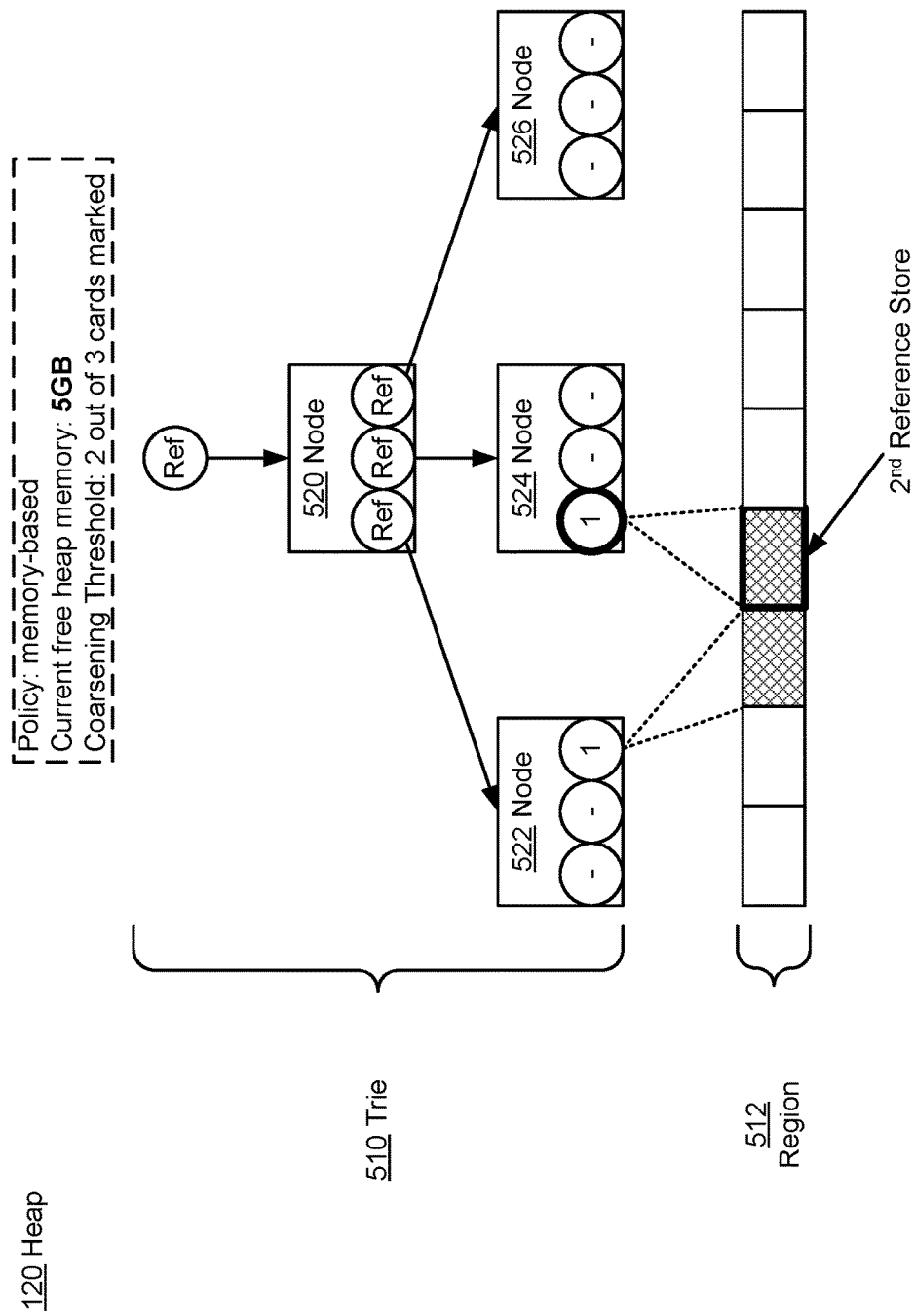

FIG. 5A additionally displays that the policy assigned to region 512 is memory based. In particular, the policy may lower the coarsening threshold in response to the amount of free heap memory in heap 120 dropping below a memory threshold (e.g., 2 GB of free heap memory). As shown in FIG. 5A, the coarsening threshold currently allows a node to be pruned only if the node stores two marked entries or more. Additionally, the amount of free heap memory currently in heap 120 is 20 GB FIG. 5B displays one or more operations that occur in trie 510 and region 512 in response to a first reference store by software program 104. As shown in FIG. 5B, the program stores a reference to the third card of region 512. In response to the first reference store, garbage collector 128 finds the deepest entry within trie 510 that corresponds to the card that covers the location of the store, which is determined to be the right entry of node 522. Garbage collector 128 then marks the third card by modifying the right entry of node 522. Because the state of trie 510 has changed, garbage collector 128 attempts to coarsen the trie. At this point in time, heap 120 still has 10 GB of free heap memory, which is higher than the memory threshold of 2 GB. As a result, the policy does not adjust the coarsening threshold, which indicates that a node can be pruned only if it stores two marked entries. Because node 522 only stores one marked entry, garbage collector 128 stops coarsening trie 510 until the next reference store FIG. 5C displays one or more operations that occur in trie 510 and region 512 in response to a second reference store by software program 104. As shown in FIG. 5C, the program stores a reference to the fourth card of region 512. In response to the second reference store, garbage collector 128 marks the fourth card by modifying the left entry of node 524. Again, although the state of trie 510 has changed, garbage collector 128 does not coarsen the trie because (1) heap 120 still has 5 GB of free heap memory, (2) the coarsening threshold still requires a node to store two marked entries before the node can be pruned, and (3) node 524 only stores one marked entry. As a result, no coarsening occurs in trie 510 until the next reference store.

Figure 5D:
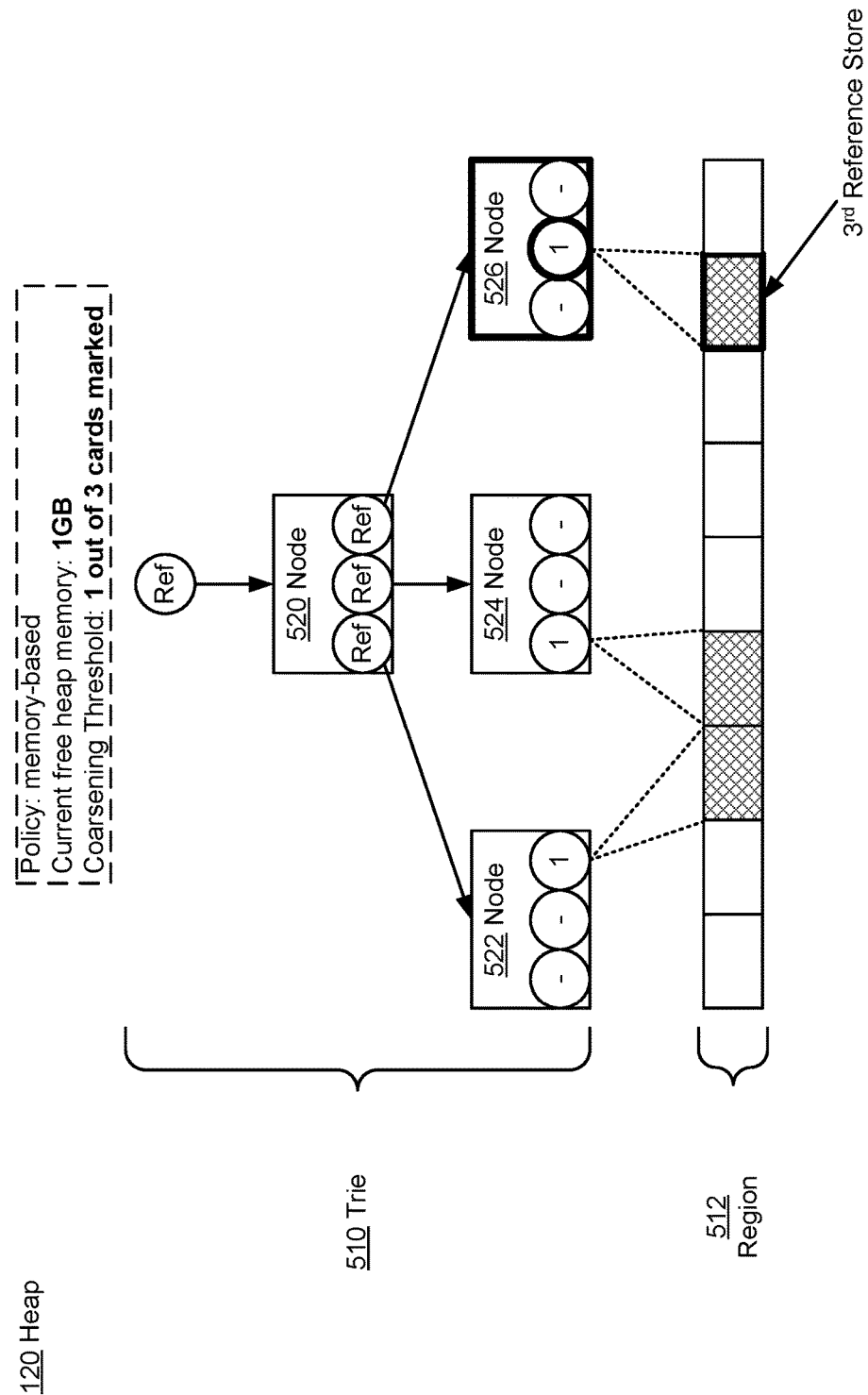
Figure 5E:
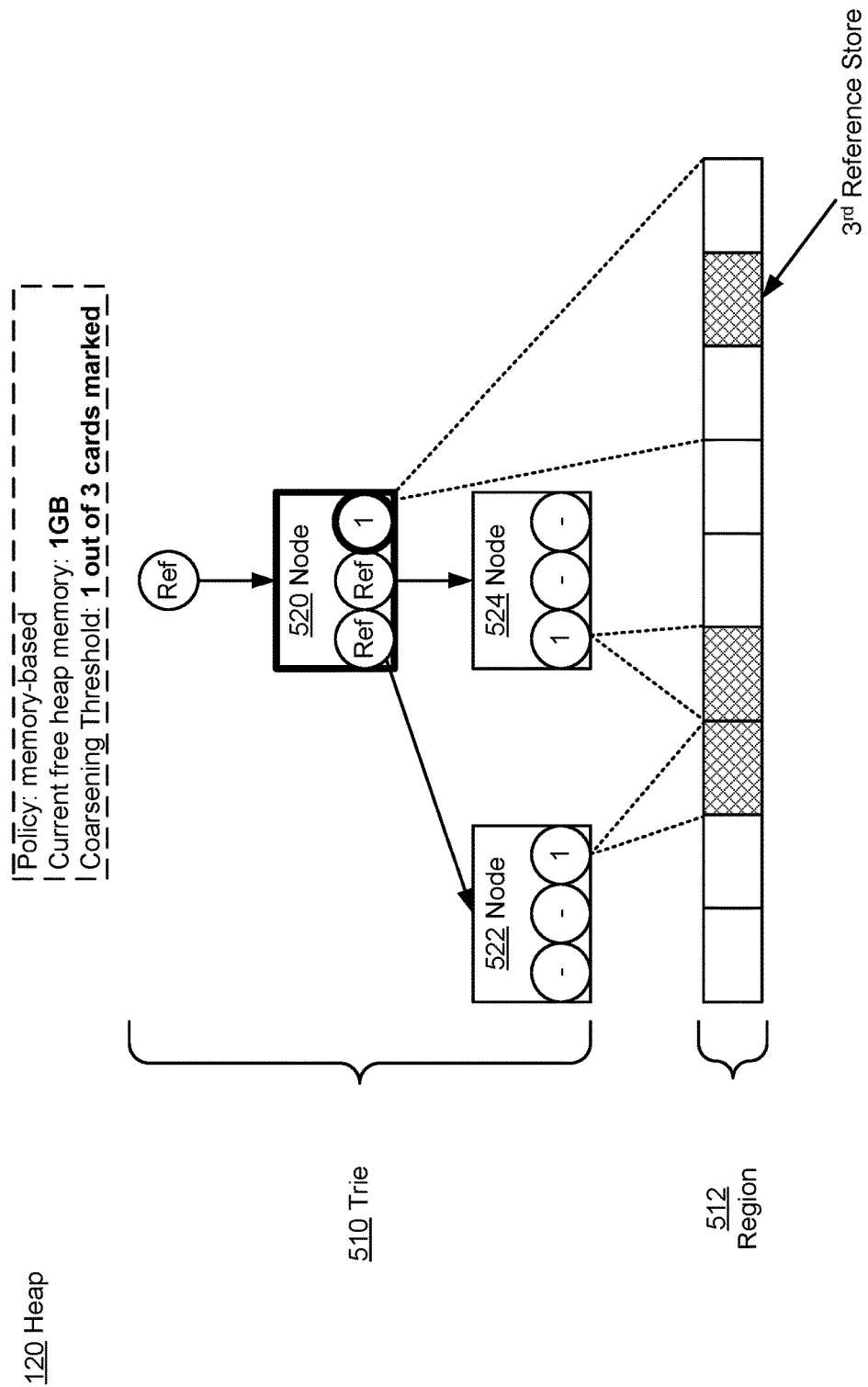
Figure 5F:
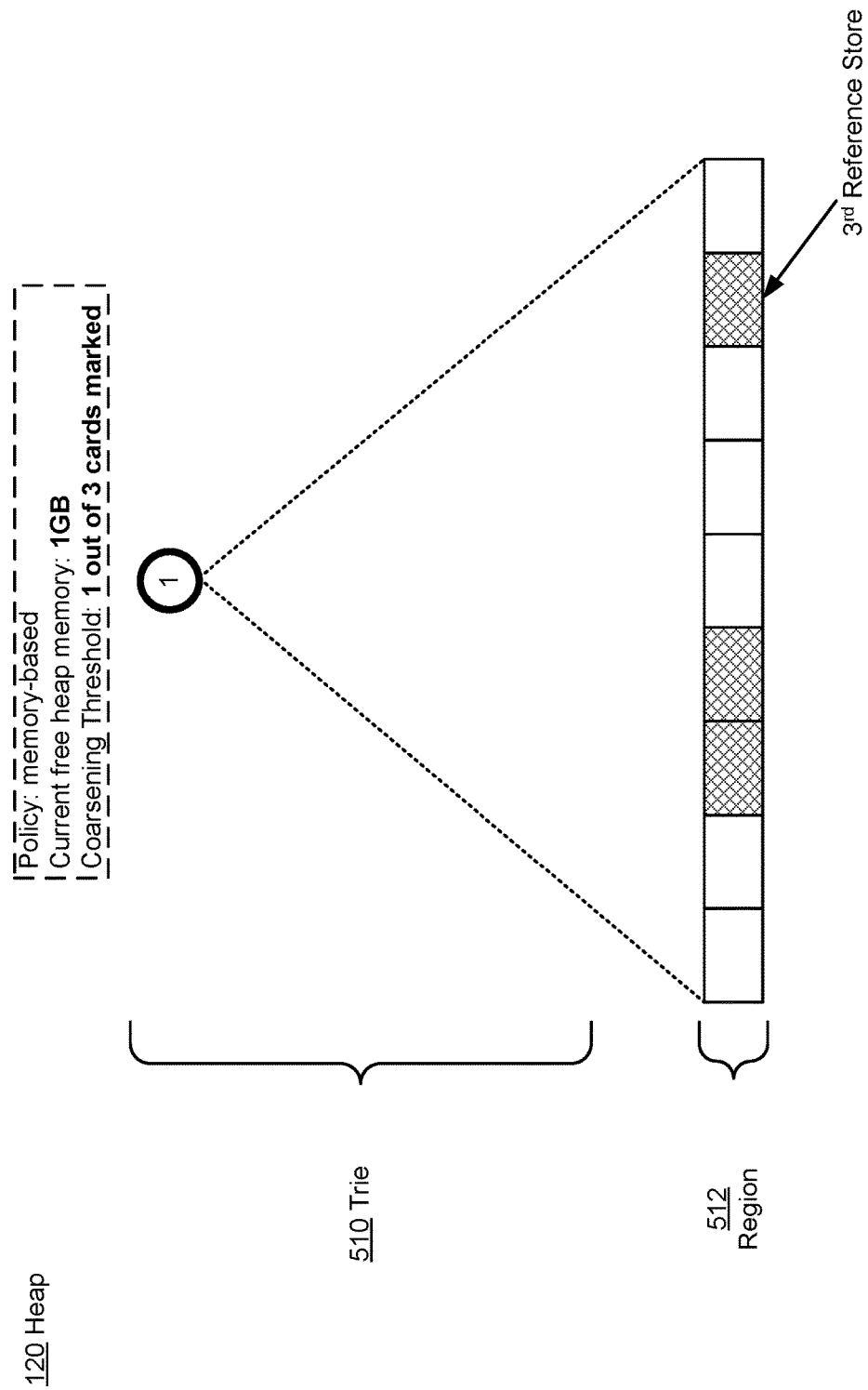

FIGS. 5D-5F displays one or more operations that occur in trie 510 and region 512 in response to a third reference store by software program 104. As shown in FIG. 5D, the program stores a reference to the eighth card of region 512. In response to the third reference store, garbage collector 128 marks the fourth card by modifying the middle entry of node 526. At this point in time, heap 120 now only has 1 GB of free heap memory, which is lower than the memory threshold of 2 GB. As a result, the policy adjusts the coarsening threshold, which now indicates that a node can be pruned if it stores at least one marked entry. Because node 526 meets this threshold, garbage collector prunes node 526. Next, as shown in FIG. 5E, node 520 now stores a marked card as a result of pruning node 526. Because node 520 also meets the coarsening threshold, garbage collector prunes node 520. As shown in FIG. 5F, node 520 has been pruned, which results in trie 510 being collapsed into its root entry and having its root entry marked to indicate that the entirety of region 512 should be scanned during the next incremental garbage collection. It should be noted that because the policy has adjusted the coarsening policy to be less strict, trie 510 may cause garbage collector 128 to scan the entirety of region 512 even though only three out of nine cards have been marked. In making this adjustment, however, the policy has caused trie 510 to occupy far less memory, which may alleviate the shortage of free heap memory.

Figure 6A:
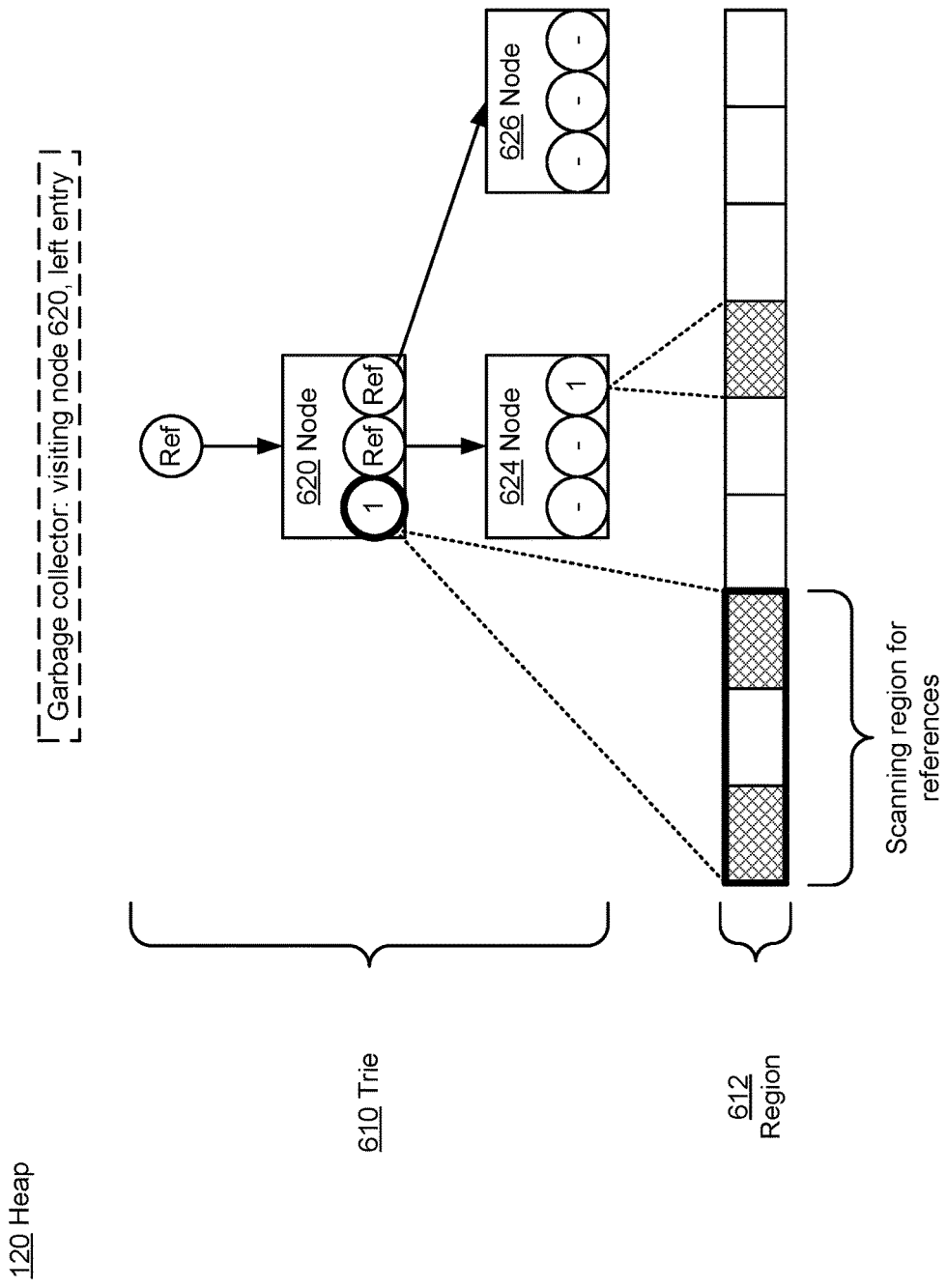
FIGS. 6A-6B show a traversal of a coarsened trie in accordance with the disclosed embodiments.
Figure 6B:
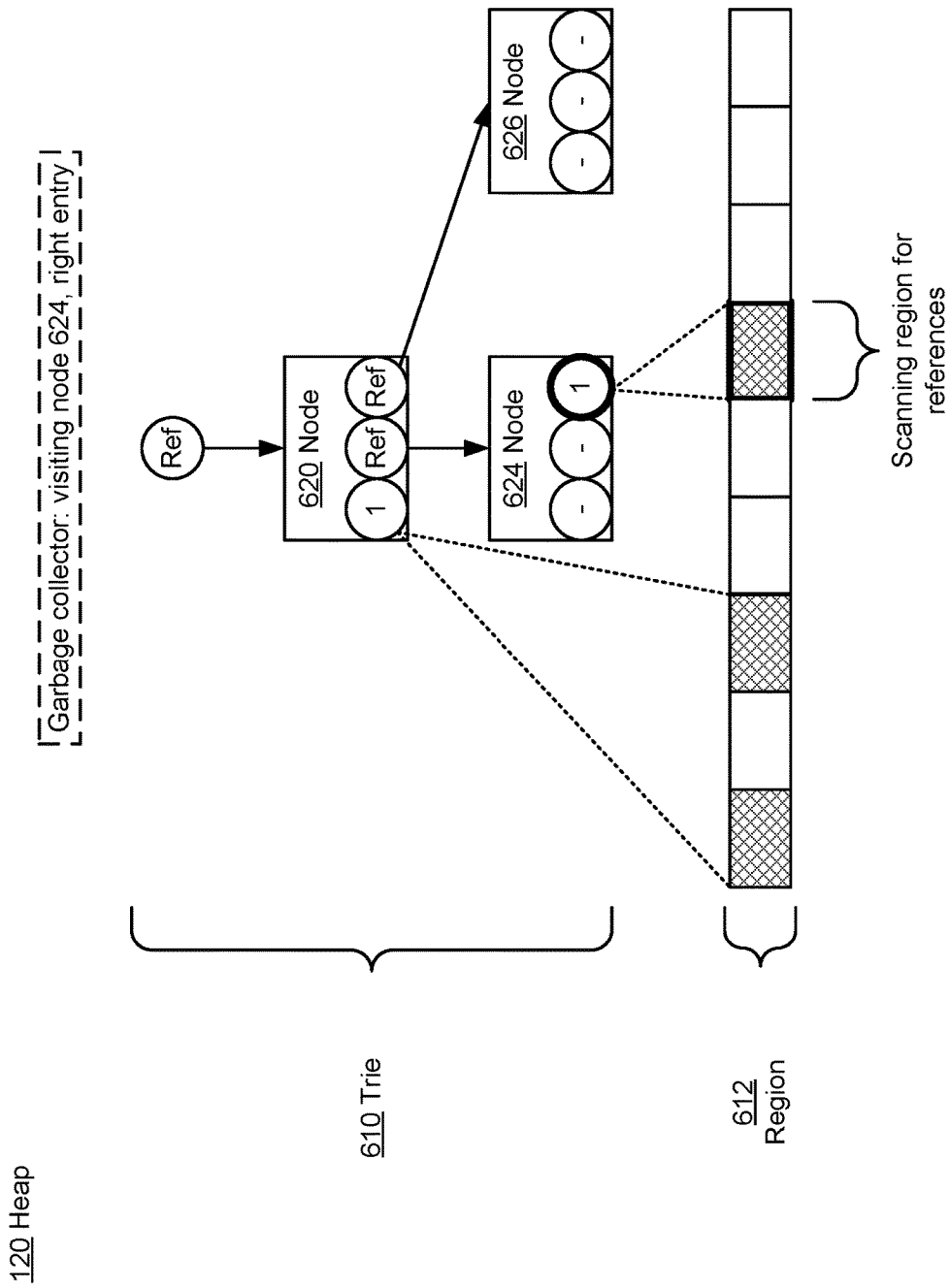

FIG. 6A-6B show a traversal of a coarsened trie in accordance with the disclosed embodiments. More specifically, FIGS. 6A-6B illustrate how a garbage collector uses a coarsened trie to efficiently scan for collection set references during an incremental garbage collection.

FIG. 6A displays an region (region 612) and a trie (trie 610) that implements a card table for tracking reference stores within the region. Region 612 is divided into nine equally sized cards. Trie 610 has three levels and each node of the trie has a maximum degree of three.

The top level of trie 610 includes the root entry, which contains a reference to interior node 620. The middle level includes node 620, which contains a left entry that is marked, and a middle entry and a right entry, which each contain a reference to a child node. The bottom level includes leaf nodes 624-626, which each contain a left entry, a middle entry, and a right entry.

FIG. 6A displays the state of region 612 and trie 610 when garbage collector 128 begins traversing the trie during an incremental garbage collection. Prior to this moment, software program 104, during its execution, made three reference stores to the first card, the third card, and the sixth card of region 612 respectively. As a result of these reference stores, the child node that the left entry of node 620 previously referred to was pruned and the left entry was marked to indicate that the three leftmost cards of region 612 should be scanned for collection set references. Additionally, the right entry of node 624 was marked to indicate that the sixth card should also be scanned.

As shown in FIG. 6A, garbage collector 128 first visits the root entry of trie 610. Finding that the root entry points to a child node, the garbage collector visits node 620. Going through each of the entries stored in node 620, the garbage collector first visits the left entry and discovers that it is marked. At this point, the garbage collector scans the larger card that corresponds to the left entry (i.e., the three leftmost cards) for collection set references, potentially discovering live objects to be preserved. In some embodiments, to determine the exact address range to scan, the garbage collector may read a start offset and a range from the left entry. Then, the garbage collector may scan a portion of region 612 that starts from a location in the region that corresponds to the start offset and ends at a location in the region that corresponds to the sum of the start offset and the range.

After scanning the card, the garbage collector may visit the middle entry of node 620 and find that it points to a child node. The garbage collector then visits the left entry of node 624 and determines that the fourth card does not need to be scanned because the left entry is unmarked. The garbage collector then visits the middle entry of node 624 and determines that fifth card does not need to be scanned because the middle entry is unmarked. As shown in FIG. 6B, garbage collector 128 then visits the right entry of node 624 and discovers that it is marked. The garbage collector then scans the sixth card for collection set references, potentially discovering live objects to be preserved. Next, the garbage collector returns back up to node 620 and visits the right entry of the node. In determining that the right entry of node 620 points to a child node, the garbage collector visits node 626 and determines, by visiting all three entries of node 626 that the seventh, eighth, and ninth cards of region 612 do not need to be scanned. After finishing the traversal of trie 610, garbage collector 128 may continue to traverse tries of other remembered sets within heap 120 and/or begin the next phase of the incremental garbage collection (e.g., copying).

It should be noted that tries that have been previously coarsened due to a policy may be later uncoarsened by the same policy. Returning to the example displayed in FIGS. 5A-5F, if heap 120's free heap memory rises back up above the 2 GB memory threshold, the policy applied to region 512 may re-adjust the coarsening threshold back to requiring a node to store two marked cards before the node can be pruned. This may cause trie 510 to become uncoarsened. In some embodiments, garbage collector 128 may use information about cards in region 512 that were obtained during a garbage collection to determine whether nodes that were pruned from trie 510 should be recreated. For example, garbage collector 128 may obtain, during a marking phase of a garbage collection, information on which cards within region 512 actually contain live objects, wherein this information obtained from the marking phase is independent from the information offered by trie 510. Here, if the garbage collector determines that a particular card no longer contains any live objects, the garbage collector can deduce that the particular card cannot contain any collection set references and is thus not marked. From this information, the garbage collector can determine which nodes that were pruned under the coarsening threshold no longer meet the current coarsening threshold and thus should be recreated because (1) the coarsening threshold has been adjusted by the policy to become stricter or (2) activities by software program 104 caused one or more objects within one or more cards of region 512 to be garbage collected and/or de-allocated.

Figure 7:
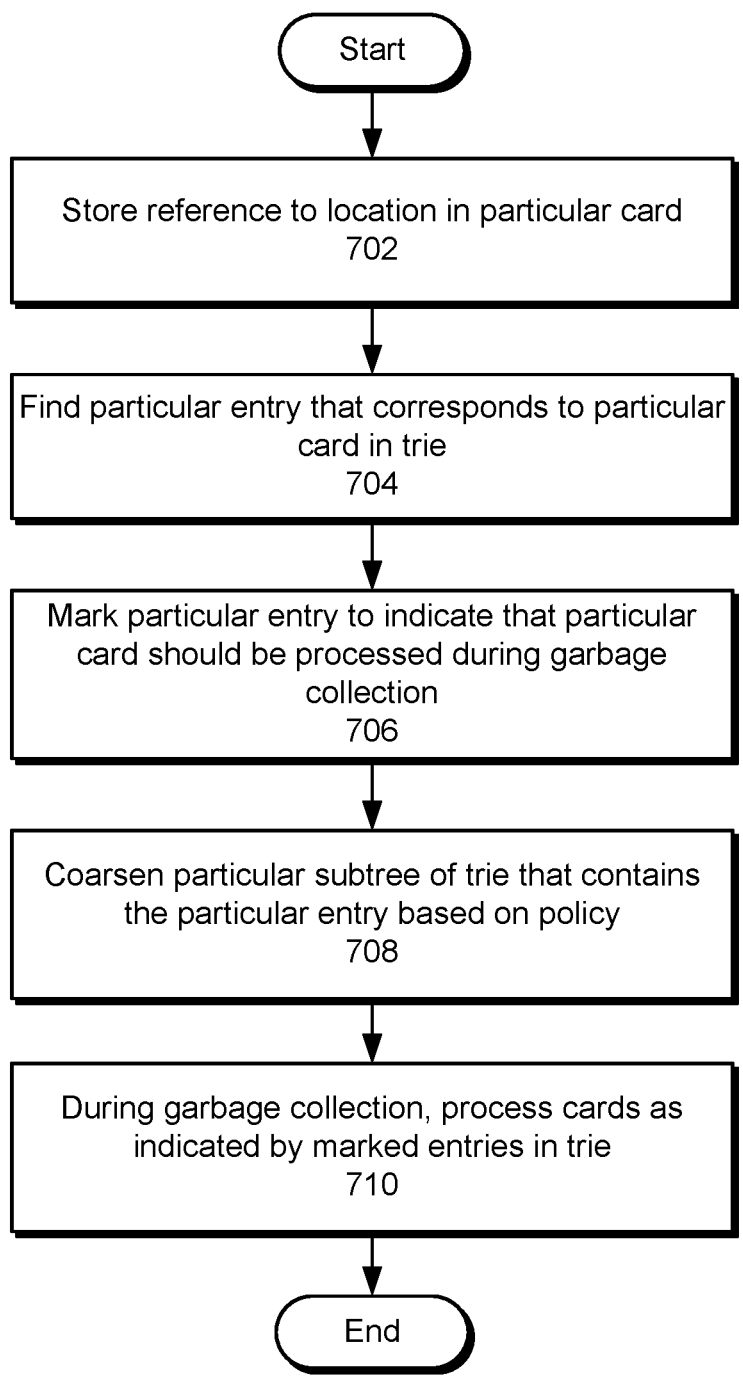
FIG. 7 shows a flowchart illustrating an exemplary process of responding to a reference store in accordance with the disclosed embodiments.

FIG. 7 shows a flowchart illustrating an exemplary process of responding to a reference store in accordance with the disclosed embodiments. In one or more embodiments, one or more of the steps may be omitted, repeated, and/or performed in a different order. Accordingly, the specific arrangement of steps shown in FIG. 7 should not be construed as limiting the scope of the embodiments.

During an execution of a software program, the software program stores a reference to a location in a particular card of a region of a heap (operation 702). In some embodiments, this region may be an old generation region or any other region that is excluded from one or more subsequent garbage collections. In response to the store, a garbage collector finds, within a trie data structure that is used as a remembered set (e.g., a card table) for the referenced region, a particular entry that corresponds to the particular card (operation 704). In some embodiments, the trie may serve as a remembered set to a plurality of regions or a mere portion of a region. Next, the garbage collector marks the particular entry to indicate that the particular card should be processed during the next incremental garbage collection (operation 706). Next, the garbage collector coarsens a particular subtree of the trie that contains the particular entry based on a policy that is applied to the region (operation 708).

Figure 8:
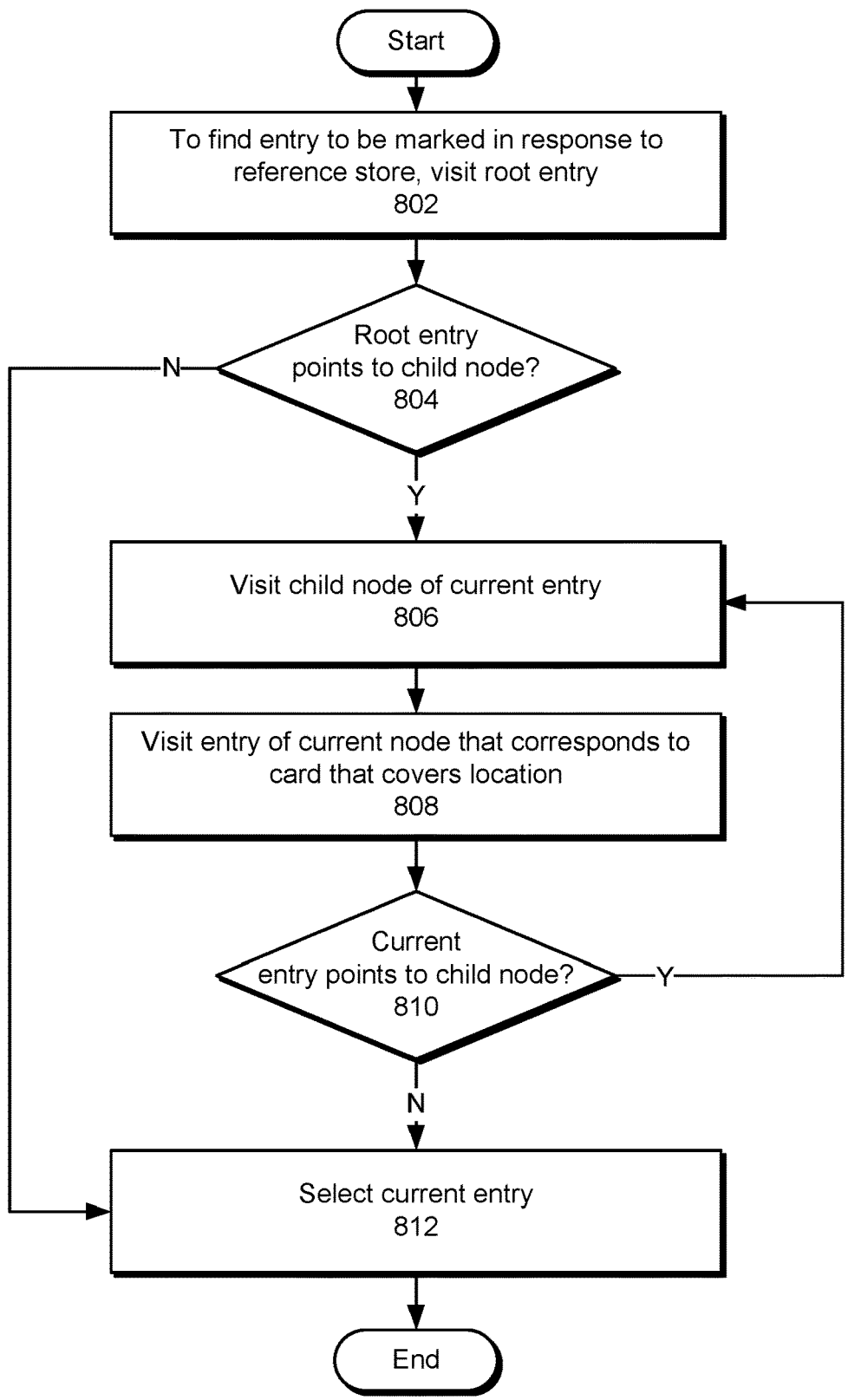
FIG. 8 shows a flowchart illustrating an exemplary process of finding an entry in a trie in accordance with the disclosed embodiments.
Figure 9:
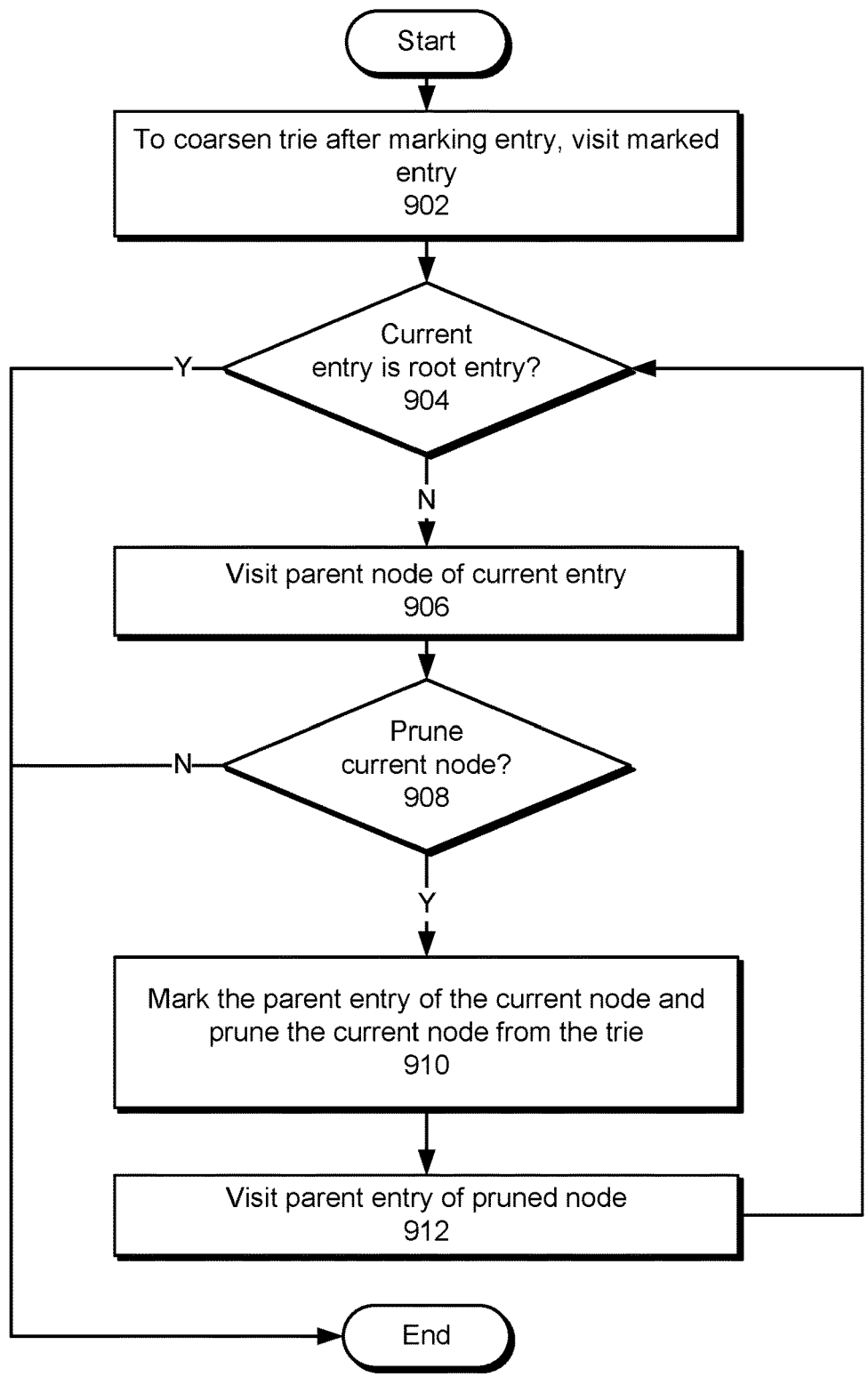
FIG. 9 shows a flowchart illustrating an exemplary process of coarsening a trie in accordance with the disclosed embodiments.
Figure 10:
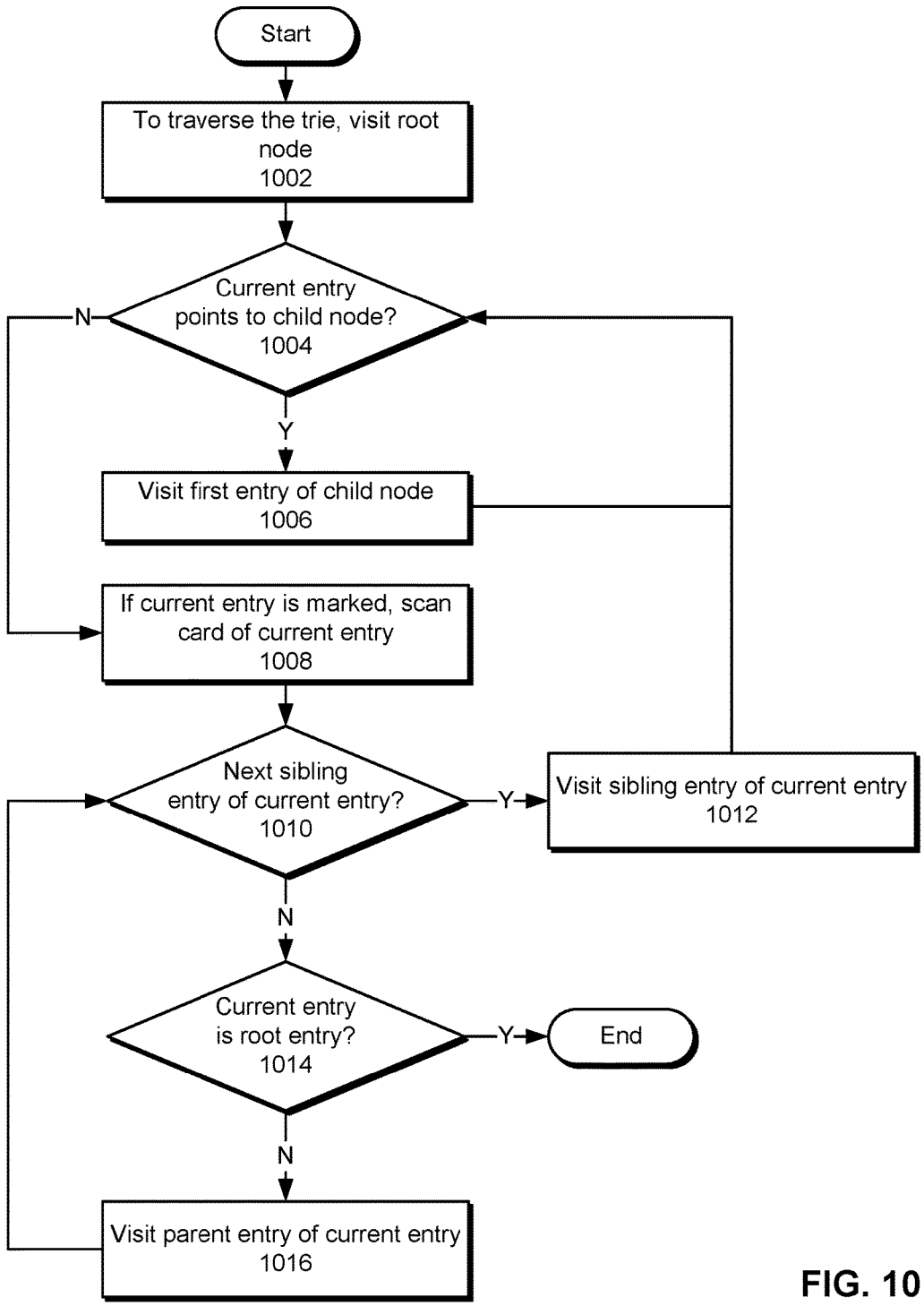
FIG. 10 shows a flowchart illustrating an exemplary process of traversing a coarsened trie in accordance with the disclosed embodiments.

During the next incremental garbage collection, the garbage collector traverses the coarsened trie to determine which cards of the region to scan for collection set references (operation 710). Whenever the garbage collector encounters a marked entry during the traversal, the garbage collector scans a card that corresponds to the marked entry for collection set references. The garbage collector may then use the collection set references to preserve objects within the collection set during the incremental garbage collection. FIG. 8 discusses, in further detail, the process of finding an entry to mark within the trie in response to a reference store. FIG. 9 discusses, in further detail, the process of coarsening the trie after the entry is marked. FIG. 10 discusses, in further detail, the process of traversing the coarsened trie to determine which cards of the region to scan for collection set references.

FIG. 8 shows a flowchart illustrating an exemplary process of finding an entry in a trie in accordance with the disclosed embodiments. In one or more embodiments, one or more of the steps may be omitted, repeated, and/or performed in a different order. Accordingly, the specific arrangement of steps shown in FIG. 8 should not be construed as limiting the scope of the embodiments.

After determining that a reference has been stored by the software program to a location within the region, the garbage collector, in order to find the entry that should be marked in response to the store, visits the root entry of the trie (operation 802). If the root entry does not point to a child node (decision 804), the garbage collector selects the root entry as the entry that should be marked (operation 812). Otherwise, the garbage collector visits the child node of the root entry (operation 806). The garbage collector then visits an entry of the root node (e.g., child node of the root entry) that corresponds to a card that covers the location (operation 808). In some embodiments, the garbage collector may extract a start offset and a range from the entry and determine whether the location falls within an address range that starts at an address that corresponds to the start offset and ends at another address that corresponds to the sum of the start offset and the range. If not, the garbage collector proceeds to the next sibling entry (sibling entries are entries that are stored in the same node). Otherwise, the garbage collector visits the entry. If the current entry (i.e., just visited entry) does not point to a child node (decision 810), the garbage collector designates the current entry as the entry that should be marked in response to the reference store (operation 812). Afterwards, the garbage collector may mark the current entry. However, if the current entry does point to a child node (decision 810), the garbage collector visits the child node and continues searching from that point for the entry that should be marked (operation 806).

FIG. 9 shows a flowchart illustrating an exemplary process of coarsening a trie in accordance with the disclosed embodiments. In one or more embodiments, one or more of the steps may be omitted, repeated, and/or performed in a different order. Accordingly, the specific arrangement of steps shown in FIG. 9 should not be construed as limiting the scope of the embodiments.

To begin the process of coarsening the trie after marking an entry, the garbage collector visits the marked entry (operation 902). If the marked entry is the root entry of the trie (decision 904), the garbage collector determines that the trie cannot be coarsened any further and stops the coarsening process. Otherwise, the garbage collector visits the marked entry's parent node (i.e., the node that stores the current entry) (operation 906). If, based on the coarsening threshold set by the policy assigned to the region, the current node should pruned (decision 908), the garbage collector marks the marked node's parent entry (i.e., the entry that points to the node that stores the marked entry) and prunes the current node from the trie (operation 910). The garbage collector then visits the parent entry of the pruned node (operation 912) and continues coarsening the trie from that point until the garbage collector either (1) reaches the root entry or (2) encounters a node that should not be pruned.

FIG. 10 shows a flowchart illustrating an exemplary process of traversing a coarsened trie in accordance with the disclosed embodiments. In one or more embodiments, one or more of the steps may be omitted, repeated, and/or performed in a different order. Accordingly, the specific arrangement of steps shown in FIG. 10 should not be construed as limiting the scope of the embodiments.

During the next incremental garbage collection, the garbage collector visits the root entry of the trie (operation 1002) to begin traversing the trie. If the root entry does not point to a child node (decision 1004), the garbage collector concludes that the trie has been completely coarsened into the root entry and, after determining that the root entry is marked, scans the cards that correspond to the root entry (operation 1008). In cases where the trie serves as a remembered set to a single region, the garbage collector may scan the entire region. Otherwise (decision 1004), the garbage collector visits the first entry (e.g., left entry) of the child node (operation 1006). If the first entry of the child node points to another child node (decision 1004), the garbage collector continues traversing down the trie until the garbage collector encounters a leaf entry. Once a leaf entry is encountered, if the leaf entry is marked, the garbage collector scans the corresponding card for collection set references (operation 1008). Next, if the leaf entry has a sibling entry that has not yet been visited (sibling entries are stored in the same node) (decision 1010), the garbage collector visits the sibling entry and continues the traversal from there (operation 1012). Otherwise, if the leaf entry is not the root entry (i.e., the leaf entry is stored in a parent node that is pointed to by a parent entry) (decision 1014), the garbage collector returns to the parent entry of the leaf entry (operation 1016) and continues traversing the trie from there (decision 1010). Otherwise, if the leaf entry is the root entry (decision 1014), the garbage collector concludes that the traversal is finished.

Figure 11:
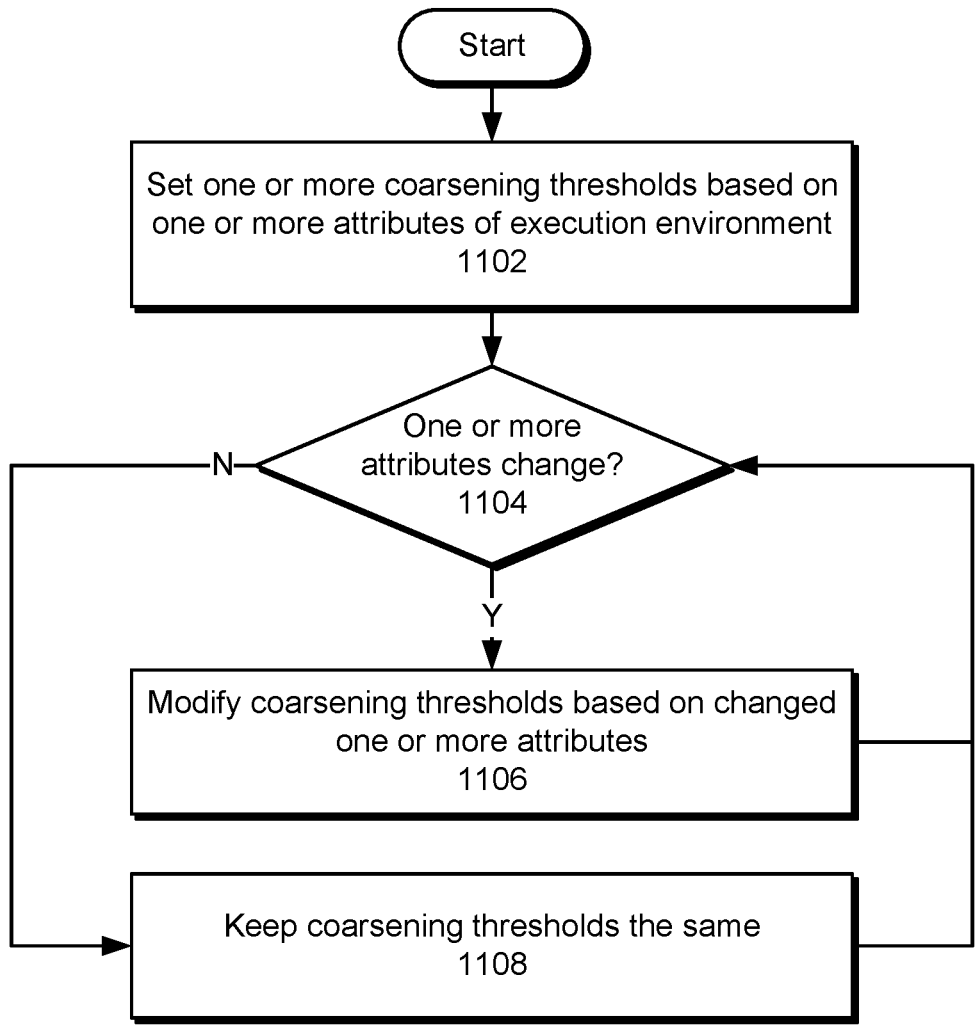
FIG. 11 shows a flowchart illustrating an exemplary process of modifying a coarsening threshold in accordance with the disclosed embodiments.

FIG. 11 shows a flowchart illustrating an exemplary process of modifying a coarsening threshold in accordance with the disclosed embodiments. In one or more embodiments, one or more of the steps may be omitted, repeated, and/or performed in a different order. Accordingly, the specific arrangement of steps shown in FIG. 11 should not be construed as limiting the scope of the embodiments.

During the execution of the software program, one or more attributes of the software program's execution environment (e.g., free heap memory, available processing resources) may change over time. A policy that applies to at least a portion of the heap may continually adjust one or more coarsening thresholds based on the state of the execution environment to cause one or more tries to use less heap memory and/or processing resources and/or improve performance for a particular portion of the heap. Initially, the garbage collector may consult the policy to set one or more coarsening thresholds for the trie based on one or more attributes of the execution environment (operation 1102). After an interval of time, the garbage collector may determine whether one or more attributes of the execution environment have changed enough to justify modifying the one or more thresholds (decision 1104). If so, the garbage collector may change the one or more coarsening thresholds to influence the behavior of the one or more tries (operation 1106). Otherwise, the garbage collector will leave the one or more coarsening thresholds unmodified (operation 1108).

Figure 12:
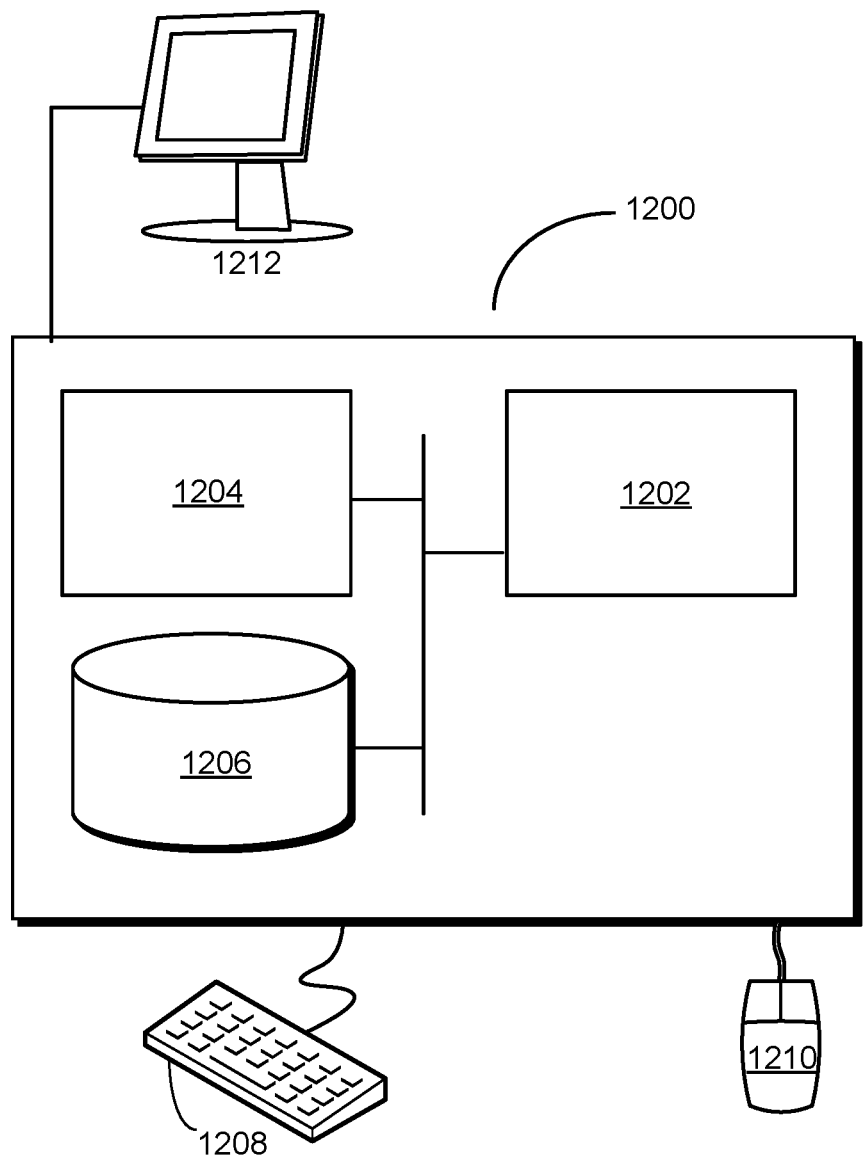
FIG. 12 shows a computer system in accordance with the disclosed embodiments.

FIG. 12 shows a computer system 1200 in accordance with an embodiment. Computer system 1200 may correspond to an apparatus that includes a processor 1202, memory 1204, storage 1206, and/or other components found in electronic computing devices such as personal computers, laptop computers, workstations, servers, mobile phones, tablet computers, and/or portable media players. Processor 1202 may support parallel processing and/or multi-threaded operation with other processors in computer system 1200. Computer system 1200 may also include input/output (I/O) devices such as a keyboard 1208, a mouse 1210, and a display 1212.

Computer system 1200 may include functionality to execute various components of the present embodiments. In particular, computer system 1200 may include an operating system (not shown) that coordinates the use of hardware and software resources on computer system 1200, as well as one or more applications that perform specialized tasks for the user. To perform tasks for the user, applications may obtain the use of hardware resources on computer system 1200 from the operating system, as well as interact with the user through a hardware and/or software linker provided by the operating system.

In one or more embodiments, computer system 1200 provides garbage collection mechanism that uses one or more trie data structures, which can be dynamically coarsened, to implement one or more remembered sets for tracking collection set references within one or more regions of a heap that are excluded from the collection set.

In addition, one or more components of computer system 1200 may be remotely located and connected to the other components over a network. Portions of the present embodiments (e.g., storage apparatus, extraction apparatus, etc.) may also be located on different nodes of a distributed system that implements the embodiments. For example, the present embodiments may be implemented using a cloud computing system that improves the knowledge and management of memory consumption in a set of remote software programs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method, comprising:
   responsive to storing a reference into a location in a referenced memory area during the execution of a software program:
      finding, within a trie that serves as a remembered set for the referenced memory area, a particular entry that corresponds to a particular address range that covers the location, the trie comprising interior nodes and leaf nodes, each leaf node storing a plurality of entries that each corresponds to an address range in the referenced memory area, each interior node storing a plurality of entries that each:
         points to a child node of the interior node; and
         corresponds to a larger address range that covers any address range that corresponds to an entry stored in the child node; and
      marking the particular entry to indicate that the particular address range should be processed during a garbage collection on the software program; and
   based on a policy,
      setting a coarsening threshold that allows an ancestor node of the particular entry to be pruned if a number of marked entries stored in the ancestor node exceeds the coarsening threshold;

based on the coarsening threshold, coarsening a particular subtree of the trie in which the particular entry is stored, wherein a root entry of the particular subtree corresponds to a particular larger address range that covers any address range that corresponds to an entry stored in the subtree;

after coarsening the particular subtree based on the coarsening threshold, adjusting the coarsening threshold one or more times; and during the garbage collection, processing the particular larger address range when the root entry of the particular subtree is visited.

2. The computer-implemented method of claim 1, wherein finding the particular entry comprises, for one or more descendant nodes of a root entry of the trie:

visiting, within the descendant node, an entry that corresponds to an address range that covers the location;

if the descendant node is not a leaf node, continuing to search, at a child node pointed to by the visited entry, for the particular entry; and if the descendant node is a leaf node, selecting the visited entry.

3. The computer-implemented method of claim 1, wherein coarsening the particular subtree comprises, for one or more ancestor nodes of the particular entry:

if, based on the policy, the ancestor node should be pruned:

marking a parent entry of the ancestor node to indicate that a larger address range that covers the particular address range should be processed during the garbage collection;

pruning the ancestor node from the trie; and if the parent entry is not a root entry of the trie, continuing to coarsen the particular subtree at a parent node of the ancestor node; and if, based on the policy, the ancestor node should not be pruned, stopping the coarsening of the particular subtree.

4. The computer-implemented method of claim 3:

wherein the referenced memory area comprises a heap;

wherein the trie serves as a remembered set for a region of the heap; and wherein the heap comprises a plurality of regions.

5. The computer-implemented method of claim 4:

wherein the collection set of the garbage collection comprises a first set of regions of the heap and excludes a second set of regions of the heap; and wherein processing an address range comprises scanning the address range for objects that reference one of the regions in the collection set.

6. The computer-implemented method of claim 4, further comprising at least one of:

based on the policy, reducing the coarsening threshold if an amount of free memory available to the software program decreases; and based on the policy, reducing the coarsening threshold if an amount of memory occupied by one or more remembered sets increases, wherein the one or more remembered sets comprises the remembered set.

7. The computer-implemented method of claim 3, further comprising at least one of:

based on the policy, increasing the coarsening threshold if a thread count of the software program increases; and based on the policy, decreasing the coarsening threshold if a thread count of the software program decreases.

8. The computer-implemented method of claim 4, wherein the coarsening threshold is set based on a property that is unique to the region.

9. The computer-implemented method of claim 1, wherein an entry comprises at least one of:

a 32 bit address that refers to a child node of the entry;

a 64 bit address that refers to the child node of the entry;

a first special value that indicates that the entry is marked; and a second special value that indicates that the entry is unmarked.

10. An apparatus, comprising:

one or more processors; and memory storing instructions that, when executed by the one or more processors, cause the apparatus to:

responsive to storing a reference into a location in a referenced memory area during the execution of a software program:

find, within a trie that serves as a remembered set for the referenced memory area, a particular entry that corresponds to a particular address range that covers the location, the trie comprising interior nodes and leaf nodes, each leaf node storing a plurality of entries that each corresponds to an address range in the referenced memory area, each interior node storing a plurality of entries that each:

points to a child node of the interior node; and corresponds to a larger address range that covers any address range that corresponds to an entry stored in the child node; and mark the particular entry to indicate that the particular address range should be processed during a garbage collection on the software program; and based on a policy, setting a coarsening threshold that allows an ancestor node of the particular entry to be pruned if a number of marked entries stored in the ancestor node exceeds the coarsening threshold;

based on the coarsening threshold, coarsening a particular subtree of the trie in which the particular entry is stored, wherein a root entry of the particular subtree corresponds to a particular larger address range that covers any address range that corresponds to an entry stored in the subtree;

after coarsening the particular subtree based on the coarsening threshold, adjusting the coarsening threshold one or more times; and during the garbage collection, processing the particular larger address range when the root entry of the particular subtree is visited.

11. The apparatus of claim 10, wherein finding the particular entry comprises, for one or more descendant nodes of a root entry of the trie:

visiting, within the descendant node, an entry that corresponds to an address range that covers the location;

if the descendant node is not a leaf node, continuing to search, at a child node pointed to by the visited entry, for the particular entry; and if the descendant node is a leaf node, selecting the visited entry.

12. The apparatus of claim 10, wherein coarsening the particular subtree comprises, for one or more ancestor nodes of the particular entry:

if, based on the policy, the ancestor node should be pruned:

marking a parent entry of the ancestor node to indicate that a larger address range that covers the particular address range should be processed during the garbage collection;

pruning the ancestor node from the trie; and if the parent entry is not a root entry of the trie, continuing to coarsen the particular subtree at a parent node of the ancestor node; and if, based on the policy, the ancestor node should not be pruned, stopping the coarsening of the particular subtree.

13. The apparatus of claim 12:

wherein the referenced memory area comprises a heap;

wherein the trie serves as a remembered set for a region of the heap; and wherein the heap comprises a plurality of regions.

14. The apparatus of claim 13:

wherein a collection set of the garbage collection comprises a first set of regions of the heap and excludes a second set of regions of the heap; and wherein processing an address range comprises scanning the address range for objects that reference one of the regions in the collection set.

15. The apparatus of claim 13, further comprising at least one of:

based on the policy, reducing the coarsening threshold if an amount of free memory available to the software program decreases; and based on the policy, reducing the coarsening threshold if an amount of memory occupied by one or more remembered sets increases, wherein the one or more remembered sets comprises the remembered set.

16. The apparatus of claim 12, further comprising at least one of:

based on the policy, increasing the coarsening threshold if a thread count of the software program increases; and based on the policy, decreasing the coarsening threshold if a thread count of the software program decreases.

17. The apparatus of claim 13, wherein the coarsening threshold is set based on a property that is unique to the region.

18. One or more non-transitory computer-readable storage media storing instructions that when executed by a computer cause the computer to perform a method, the method comprising:

responsive to storing a reference into a location in a referenced memory area during the execution of a software program:

finding, within a trie that serves as a remembered set for the referenced memory area, a particular entry that corresponds to a particular address range that covers the location, the trie comprising interior nodes and leaf nodes, each leaf node storing a plurality of entries that each corresponds to an address range in the referenced memory area, each interior node storing a plurality of entries that each:

points to a child node of the interior node; and corresponds to a larger address range that covers any address range that corresponds to an entry stored in the child node; and marking the particular entry to indicate that the particular address range should be processed during a garbage collection on the software program; and based on a policy, setting a coarsening threshold that allows an ancestor node of the particular entry to be pruned if a number of marked entries stored in the ancestor node exceeds the coarsening threshold;

based on the coarsening threshold, coarsening a particular subtree of the trie in which the particular entry is stored, wherein a root entry of the particular subtree corresponds to a particular larger address range that covers any address range that corresponds to an entry stored in the subtree;

after coarsening the particular subtree based on the coarsening threshold, adjusting the coarsening threshold one or more times; and during the garbage collection, processing the particular larger address range when the root entry of the particular subtree is visited.

* * * * *